(12) United States Patent
Gustavson

(10) Patent No.: US 12,373,501 B2
(45) Date of Patent: *Jul. 29, 2025

(54) OPTIMIZED ARTIFICIAL INTELLIGENCE SEARCH SYSTEM AND METHOD FOR PROVIDING CONTENT IN RESPONSE TO SEARCH QUERIES

(71) Applicant: Mark Gustavson, San Francisco, CA (US)

(72) Inventor: Mark Gustavson, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,956

(22) Filed: Jul. 22, 2024

(65) Prior Publication Data
US 2024/0378249 A1     Nov. 14, 2024

Related U.S. Application Data

(63) Continuation-in-part of application No. 17/824,358, filed on May 25, 2022, now Pat. No. 12,045,300, which is a continuation-in-part of application No. 16/748,279, filed on Jan. 21, 2020, now Pat. No. 11,347,817.

(60) Provisional application No. 62/925,411, filed on Oct. 24, 2019.

(51) Int. Cl.
*G06F 16/953* (2019.01)
*G06N 5/02* (2023.01)

(52) U.S. Cl.
CPC ............. *G06F 16/953* (2019.01); *G06N 5/02* (2013.01)

(58) Field of Classification Search
None
See application file for complete search history.

(56) References Cited

U.S. PATENT DOCUMENTS

| | | |
|---|---|---|
| 2009/0106224 A1 | 4/2009 | Roulland et al. |
| 2009/0164929 A1 | 6/2009 | Chen et al. |
| 2014/0372419 A1 | 12/2014 | Li et al. |
| 2015/0046435 A1 | 2/2015 | Donneau-Golencer |
| 2015/0324434 A1 | 11/2015 | Greenwood et al. |
| 2020/0012697 A1 | 1/2020 | Fan et al. |

*Primary Examiner* — Eddy Cheung
(74) *Attorney, Agent, or Firm* — Steven A. Nielsen; www.NielsenPatents.com

(57) ABSTRACT

An optimized artificial intelligence search system may comprise a tab icon or folder manipulation that are populated by knowledge graphs in a mixed or augmented reality environment. Systems of presentation may include a category first level derived by pre processing, a specific type second level derived by semantic vector space modelling and a third specific item information level derived by clustering and weighted model ontology. The presentation of information may also be presented in a left or right screen preference to comport with right and left brain function. Information displays may include timeline analysis. Data and tabular data structures may interact with dynamic knowledge graph super structures. Stop word lists may be used to remove uninformative terms or related queries. Subcategories of information or display my deployed by use of real time vector space modeling. Tab icons may be displayed upon user eyewear.

14 Claims, 14 Drawing Sheets

700b

704

A Heat Map Based on How Often Users Select Certain Tiles that Allow Users to Participate in a Given Search Community. For Instance, Users Who Regularly Search Sports Will See a Heat Map During Major Sporting Events The Tiles Such as SN-Website, Images, E-Commerce Website, Books

OPTIMIZED ARTIFICIAL INTELLIGENCE SEARCH SYSTEM AND METHOD FOR PROVIDING CONTENT IN RESPONSE TO SEARCH QUERIES

CROSS REFERENCE TO RELATED PATENT APPLICATIONS

This utility application is a continuation in part (CIP) of patent application Ser. No. 17/824,358 filed on May 25, 2022, now U.S. Pat. No. 12,045,300 issued on May 25, 2022 which is a CIP of application Ser. No. 16/748,279 filed on Jan. 21, 2020, now U.S. Pat. No. 11,347,817 issued on May 31, 2022 which claims the benefit and priority date of U.S. patent application 62/925,411 filed on Oct. 24, 2019, the contents of which are incorporated herein by reference as if restated herein.

Copyright and Trademark Notice

This application includes material which is subject or may be subject to copyright and/or trademark protection. The copyright and trademark owner(s) has no objection to the facsimile reproduction of any part of the patent disclosure, as it appears in the Patent and Trademark Office files or records, but otherwise reserves all copyright and trademark rights whatsoever.

TECHNICAL FIELD

The disclosed subject matter relates generally to search engine query analysis. More particularly or specifically, the present disclosure relates to an artificial intelligence optimized search system and a method for generating and displaying relevant content in tabular form, use of heat maps and use of right and left brain functions to place information on the most useful side of viewer. i

BACKGROUND

Search engines implement computerized search algorithms to allow users to search resources such as relevant websites or databases. The search engines are configured to locate resources that are relevant to the search query or queries. Users enter a search query consisting of strings of alphanumeric characters or words. The search query can take forms ranging from a single search term (or query) to a complex sentence composed in a natural language. When used in conjunction with the search engine, the word concept generally refers to a construct such as a cluster of related words associated with a keyword.

With current search engines, once the search query is completed, no assistance is given to tailor future queries and find more regarding a user's requirements. If users do not find what they want, they need to start all over again with a new search query. Because the new query has no awareness of what the user has already considered and dismissed as not useful, the user will be repeatedly shown things they have already seen, making it more difficult to sift through new data. Even worse, future searches on later queries continue to bombard the user with results which have been already deemed useless by him/her. Currently, existing search engines are incapable of providing efficient search results to the user. Due to lack of search query tracking, the current search engines fail to remember anything from previous searches and are therefore unable to help a user find what is important to him/her. The existing search engines are also unable to customize or collaborate with the obtained search results. Further, the existing search engines are unsuitable for virtual reality/augmented reality systems.

In light of the aforementioned discussion, there exists a need for a more powerful and efficient search system for providing content with novel methodologies that would overcome the above-mentioned disadvantages. These methodologies provide for the delivery of data as images and animation describing the content therein.

SUMMARY

The following presents a simplified summary of the disclosure in order to provide a basic understanding for the reader. This summary is not an extensive overview of the disclosure and it does not identify key/critical elements of the invention or delineate the scope of the invention. The sole purpose of this summary is to present some concepts disclosed herein in a simplified form as a prelude to the more detailed description that follows.

An objective of the present disclosure is directed toward an artificial intelligence optimized search system that improves the internet experience and is entirely suitable for simulation systems.

Another objective of the present disclosure is directed towards an artificial intelligence optimized search system that executes a list of search results in a simulation environment using 3-D manipulation techniques and allows the user to manipulate and sift the list of search results in the simulation environment.

Another objective of the present disclosure is directed toward an artificial intelligence optimized search system that provides for a first ever user-directed multi-channel structure to explore results from templates simultaneously delivering topics.

Another objective of the present disclosure is directed toward an artificial intelligence optimized search system that enables a number of information communities, including thought leaders and enthusiastic followers to obtain outstanding results.

Another objective of this present disclosure is directed towards an artificial intelligence optimized search system that provides thought leaders with a template tool to allow capturing an expert's thought process, thereby aiding searches of information to build useful results for the users.

Another objective of the present disclosure is directed toward an artificial intelligence optimized search system to easily capture expert knowledge about searching, and apply templates across many related topics to identify highly relevant information for the community.

Another objective of the present disclosure is directed toward an artificial intelligence optimized search system specifying templates that look for information on a given topic. For example, with a template aggregator, a search query about the life of a president would direct the search under refinements such as life, political career, events, books and videos about the president, etc.

Another objective of the present disclosure is directed toward an artificial intelligence optimized search system that employs artificial intelligence techniques within templates to provide a revolutionary way to combine multiple queries from multiple sources and filter out irrelevant information.

Another objective of the present disclosure is directed towards an artificial intelligence optimized search system that collects huge data from different online sources in response to a search query and avoids the dominance of individual biases thereby enabling users to get unbiased results.

Another objective of the present disclosure is directed toward an artificial intelligence optimized search system that allows users to see how their results are found, to learn from experts, and also to improve their search strategies.

Another objective of the present disclosure is directed towards an artificial intelligence optimized search system that provides the tools to the users to bias the search results to their own needs, rather than being forced to accept biases they may not agree with or accept.

Another objective of the present disclosure is directed toward an artificial intelligence optimized search system that allows sponsors to work with thought leaders, and enable users to explore topics, producing results that are valuable with respect to the aims of sponsors (increasing engagement with their content), thought leaders (serving their community), and for users (producing enlightenment, education, and exploration of deeper understanding).

Another objective of the present disclosure is directed towards an artificial intelligence optimized search system that improves the collection, viewing, and consumption of lists of search results.

Another objective of the present disclosure is directed towards an artificial intelligence optimized search system that combines multiple sources of search results into a user-directed set of results, helping the users to avoid the biases of any dominant individual, or even monopolistic, an existing provider of search results.

Another objective of the present disclosure is described as an artificial intelligence optimized search system that enables the content providers to recover market shares, revenues, and have a better connection with user communities.

Another objective of the present disclosure is directed towards an artificial intelligence optimized search system that allows users who have experience at finding information and offers the service of custom developed template to other users, provides for user to user, or business to the user, template marketplace.

Another objective of the present disclosure is directed towards an artificial intelligence optimized search system that generates revenue by providing search results to other applications and by modularizing certain features into libraries that may be licensed to those software applications.

Another objective of the present disclosure is directed towards an artificial intelligence optimized search system that allows users to maintain their own documents, list useful results, and/or potentially sell them with a split payment to the system or for rewards to corporate sponsors.

Another objective of the present disclosure is directed towards an artificial intelligence optimized search system that allows the user to earn rewards or money for searching and assists users who are not skilled in designing a good query.

Another objective of the present disclosure is directed towards an artificial intelligence optimized search system that provides heat maps configured to show popularity, relevance, and importance in a collaborative way.

Another objective of the present disclosure is directed towards heat maps on the computing device that reveals what others are doing, direct user's attention to the most popular categories in response to a fellow user's selections of various tiles/options.

Another objective of the present disclosure is directed towards the heat maps that act as a reporting metric to help users and sponsors to visualize the effectiveness of their templates.

Another objective of the present disclosure is directed towards an artificial intelligence optimized search system that provides the heat map in response to how often users select certain tiles that allow people to participate in a given search community. (For example, users who regularly search sports will see a heat map during major sporting events.)

Another objective of the present disclosure is directed towards the heat map having colors behind the tiles/options so that users can identify the more popular selections.

Another objective of the present disclosure is directed towards an artificial intelligence optimized search system that applies knowledge with paid, indexed, and directory generated content in response to rules within the templates to select relevant search results.

Another objective of the present disclosure is directed towards an artificial intelligence optimized search system that creates broad search query categories, (some with corporate sponsorship), and collaborative features, gather thought processes from aggregators identified by tiles (or experts in their field) for individual applicants who pay to influence the user.

Another objective of the present disclosure is directed as an artificial intelligence optimized search system that builds each field upon communities with specific content and provides tools for sharing their approach to find useful information, resulting in a free market of ideas that allow even novice internet searchers to gain insight and revenue.

Another objective of the present disclosure is directed towards an artificial intelligence optimized search system that provides tools to allow users to share template answers in response to broad question categories.

Another objective of the present disclosure is directed towards an artificial intelligence optimized search system that track of multiple project categories and alerts the user to new information available, which may be generated from paid sponsors, experts, or even other users who have built their search queries.

Another objective of the present disclosure is directed towards an artificial intelligence optimized search system that allows the user to refresh the results of previous queries depending on how they value the insight provided.

Another objective of the present disclosure is directed towards an artificial intelligence optimized search system that allows for the monetization of the search query beyond hidden advertisers' agendas.

Another objective of the present disclosure is directed towards an artificial intelligence optimized search system that serves as a bridge between grandparents, parents, and the young, giving all generations a guided approach to relevant and insightful information from the internet.

Another objective of the present disclosure is directed towards an artificial intelligence optimized search system that provides content in tile form with a heat map superimposed for peer relevancy.

Another objective of the present disclosure is directed towards an artificial intelligence optimized search system that controls it's own data, rather than a machine that extracts only the data it thinks the user needs.

Another objective of the present disclosure is directed towards an artificial intelligence optimized search system that provides customized user interfaces that acts as a dashboard to conduct query search.

Another objective of the present disclosure is directed towards an artificial intelligence optimized search system with intuitive features that make it virtually powerful with a strong stickiness factor.

Another objective of the present disclosure is directed towards an artificial intelligence optimized search system cleans, bundled searches that are truly personalized with speedy delivery.

Another objective of the present disclosure is directed towards an artificial intelligence optimized search system that shares the knowledge in a way that revolutionizes how people come together online.

Another objective of the present disclosure is directed towards an artificial intelligence optimized search system that enhances the monetization of the user experience with what is relevant by using expert systems to decipher and identifies what users want, helping them to adopt new skills, processes, and structure in order to deliver an intelligent solution. The solution is delivered in the form of a tile acting as a template aggregator.

Another objective of the present disclosure is directed towards an artificial intelligence optimized search system that builds template tiles that affect the monetization of parallel databases-all by incorporating individual online interactions that no machine can extract or extrapolate.

Another objective of the present disclosure is directed towards an artificial intelligence optimized search system whose visual navigation is intuitively compelling, rooted in the evolution of social media and personal content for mobile device, augmented or virtual reality devices, may be put into translatable forms for the simulation environment by, among other things, depicting worded content through images and animation.

Another objective of the present disclosure is directed towards an artificial intelligence optimized search system that allows content developers to make links to various kinds of research.

Another objective of the present disclosure is directed towards an artificial intelligence optimized search system that encourages the users who specialize in blogging related to one of the search verticals to link to searches pertaining to items of interest and relevance to the articles.

Another objective of the present disclosure is directed towards an artificial intelligence optimized search system which links to financial sites that look in depth at various companies and also links to the stock market trading sites on various trading analysis techniques.

Another objective of the present disclosure is directed towards an artificial intelligence optimized search system that provides the benefits of creating an account include: tracking search history (for the user's own benefit), sharing search history and personal notes on searches between devices, (for instance, to conduct competitive research), creating separate category lists of searches (such as, collections of saved posts on social media websites), easily returning to previous searches being notified when previous topics of interest are updated with additional information (via template changes, refresh spidering, etc.), offering a feature to segment their search history, categorization or labelling, creating private shareable search templates, requesting searches on demand or automatically on a schedule, and sharing-think competitive research being done by a small team.

Another objective of the present disclosure is directed towards an artificial intelligence optimized search system that monetizes its delivery system through multiple dynamic aggregators that are sponsored, paid for by experts, or monetized by users who share their search activity.

Another objective of the present disclosure is directed towards an artificial intelligence optimized search system that creates multiple delivery options with other mediums and interactions with potential consumer bases, allowing for exponential corporate growth in delivering a complimentary brand image.

Another objective of the present disclosure is directed towards an artificial intelligence optimized search system that allows the user to more easily recognize where they want to go with light imaging overlay, a design that translates easily to the AR/VR way of the future.

Another objective of the present disclosure is directed towards the artificial intelligence optimized search system takes the sharing of information from a static web portal to an interactive user base.

Another objective of the present disclosure is directed towards an artificial intelligence optimized search system that creates a collaborative and more pleasurable search experience.

Another objective of the present disclosure is directed towards an artificial intelligence optimized search system that is an immediate and transparent layer of communication and through a resurgence of the global web community that values diversity in ideas and provides opportunities to users to personally gain from the experience.

Another objective of the present disclosure is directed towards an artificial intelligence optimized search system that creates a safe place for the sharing of ideas with bias and diversity in balance.

Another objective of the present disclosure is directed towards an artificial intelligence optimized search system that increases research among mobile users, providing the ability to make granular and generic searches with ease and comfort through the multi-source search query and its unique UI/UX design, that also allows the user to customize their interface with preferences, styles, look, and design.

Another objective of the present disclosure is directed towards an artificial intelligence optimized search system that learns the user's behavior and interests to help yield more refined insights across all devices- and across all borders.

Another objective of the present disclosure is directed towards an artificial intelligence optimized search system that captures each person's missed opportunities in the race to digitize and transform intelligent theories.

Another objective of the present disclosure is directed towards an artificial intelligence optimized search system that encourages the users to dream bigger and helps them find their answers fast.

Another objective of the present disclosure is directed towards an artificial intelligence optimized search system that accelerates search through painless, intelligent, and reliable discovery.

Another objective of the present disclosure is directed towards an artificial intelligence optimized search system that enables both mass customization and monetization.

Another objective of the present disclosure is directed towards an artificial intelligence optimized search system that allows the users who take the time to learn the templates for preserving and apply expert knowledge in search, can become template authors and produce templates on topics of interest, and then offer these templates for sale to other users.

Another objective of the present disclosure is directed towards an artificial intelligence optimized search system that drives traffic, creates impressions, and new topics, monetizes with advertising.

Another objective of the present disclosure is directed towards an artificial intelligence optimized search system that leases or sells placement on certain tiles.

Another objective of the present disclosure is directed towards an artificial intelligence optimized search system that provides organizing information and allows the users to explore that organized information.

Another objective of the present disclosure is directed towards an artificial intelligence optimized search system that incorporates compelling research with a strong brand identity, providing educational, legal, and additional identified market users to use and subscribe to the line of products.

Another objective of the present disclosure is directed towards an artificial intelligence optimized search system that provides rich, accurate, and fast resourcing by aggregating the responses to queries across various templated tiles.

Another objective of the present disclosure is directed towards an artificial intelligence optimized search system in response to timeless, extensive usage and behavior patterns.

Another objective of the present disclosure is directed towards an artificial intelligence optimized search system that provides immediate answers, answers to user questions.

Another objective of the present disclosure is directed towards an artificial intelligence optimized search system that incorporates specific usage patterns and creates a basis for locating historical search information and current market data.

Another objective of the present disclosure is directed towards an artificial intelligence optimized search system that delivers immediate on demand research in response to user-defined parameters.

Another objective of the present disclosure is directed towards an artificial intelligence optimized search system that provides insight into the underlying goals of each search that potentially address real customer needs.

Another objective of the present disclosure is directed towards an artificial intelligence optimized search system that allows the team to answer questions, consider feedback, and assist customers in finding the information they are seeking.

Another objective of the present disclosure is directed towards an artificial intelligence optimized search system that grants users any access to information and other non-confidential searches.

Another objective of the present disclosure is directed towards an artificial intelligence optimized search system that continually identifies new search insights and capabilities to enhance its technology and evolve its processes, with the aim of ensuring that its product line meets the needs of the entire targeted marketplace.

Another objective of the present disclosure is directed towards an artificial intelligence optimized search system that is ever-vigilant in identifying user needs and evolving its business tools and services for the user's benefit.

Another objective of the present disclosure is directed towards an artificial intelligence optimized search system that implements the search engine optimization to increase visibility and create easier access to the website for app downloads and installation.

Another objective of the present disclosure is directed towards an artificial intelligence optimized search system that reveals the goal on the first page of relevant searches matching specified keywords.

Another objective of the present disclosure is to present tabular information or folder manipulation with such views populated by knowledge graphs in a missed or augmented reality environment.

Another objective of the present disclosure is to present tabs on a smartphone with the tab search results then transmitted to user eyeglasses wherein the tabs may be controlled by movement of the smartphone, hand movements by IR sensors or other means or by user brain activity by use of a neural connection or other means. Search results may be presented via mixed reality or other integrations with a user's view or viewing environment.

In an embodiment of the present disclosure, the system consists of a computing device configured to allow a user to input one or more search queries into a content extraction module that is in communication with an optimized search engine, so that the optimized search engine configured to receive one or more search queries from the content extraction module and execute the search queries to render a list of search results to the content extraction module.

In another embodiment of the present disclosure, the system further comprising a database comprising one or more templates associated with one or more topics and the optimized search engine configured to interact with the database to choose the one or more templates associated with the one or more topics in response to the one or more search queries, the optimized search engine further configured to collect the list of search results from a plurality of online sources using the one or more chosen templates and transfer the collected list of search results to the content extraction module, the content extraction module configured to highlight a relevant content of a plurality of web pages from the list of search results and display the highlighted relevant content of the plurality of web pages from the list of search results by filtering out an irrelevant content on the computing device.

In another embodiment of the present disclosure, the computing device configured to execute the list of search results in a simulation environment to the user using one or more three-dimensional (3D) manipulation techniques from the content extraction module.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 depicts a schematic representation of the artificial intelligence optimized search system for providing relevant content in response to search queries, in accordance with one or more exemplary embodiments.

Figure 1:
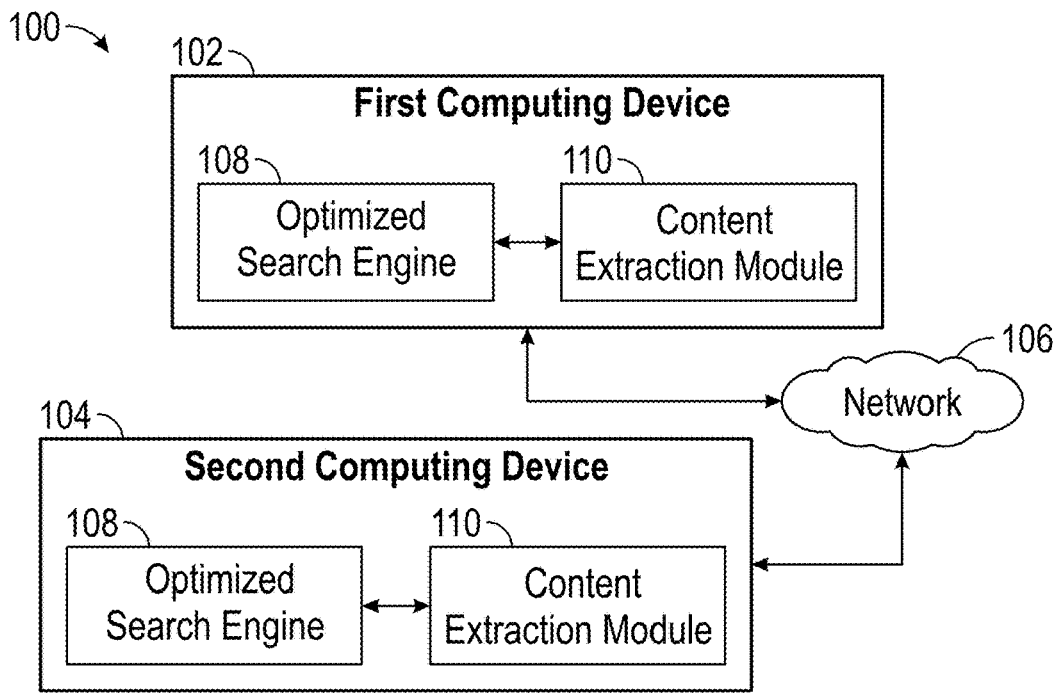
FIG. 1 is a block diagram representing an artificial intelligence optimized search system in which aspects of the present disclosure can be implemented. Specifically.

Furthermore, the objects and advantages of this invention will become apparent from the following description and the accompanying annexed drawings.

REFERENCE NUMERALS IN THE DRAWINGS

FIG. 1, 100 discloses an artificial intelligence optimized search system
   102 First Computing Device of artificial intelligence optimized search system 100
   104 Second Computing Device of artificial intelligence optimized search system 100
   106 Network of artificial intelligence optimized search system 100
   108 Optimized Search Engine of artificial intelligence optimized search system 100
   110 Content Extraction Module of artificial intelligence optimized search system 100

Figure 2:
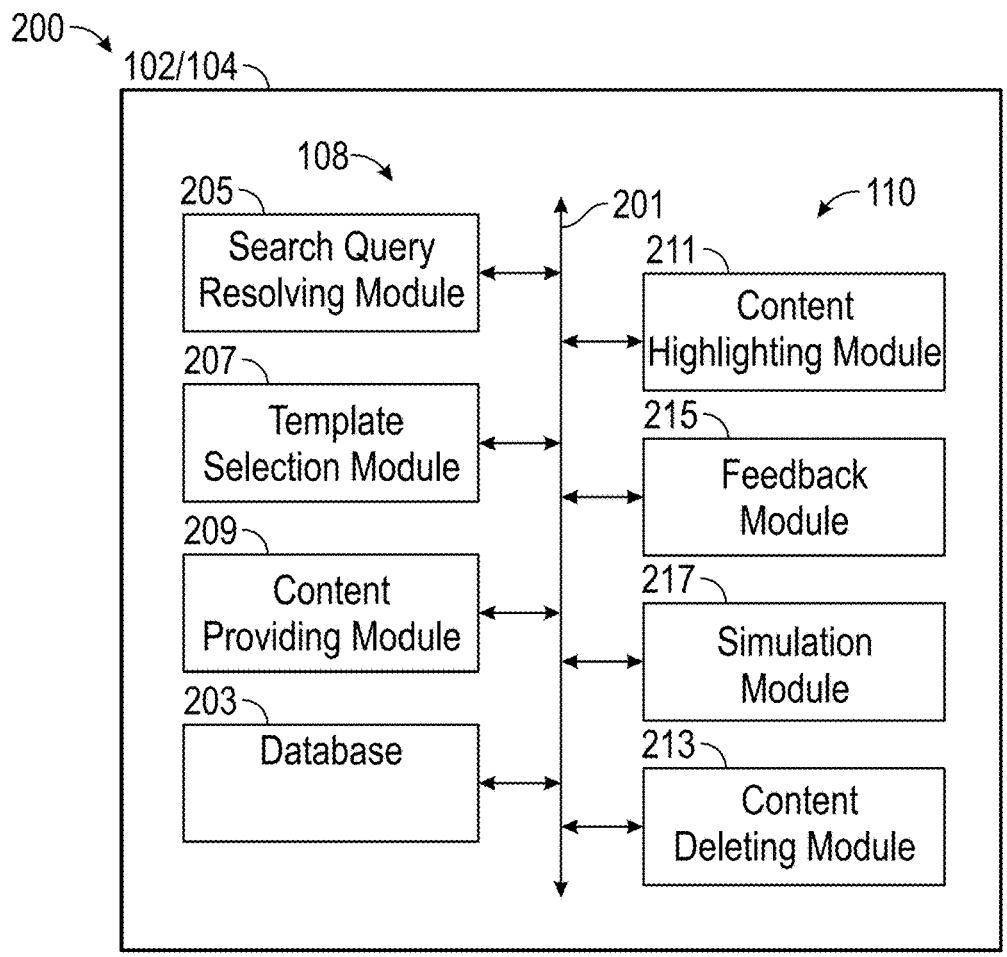
FIG. 2 is a block diagram depicting a schematic representation of the first computing device and/or the second computing device shown in FIG. 1, in accordance with one or more exemplary embodiments.
Figure 3:
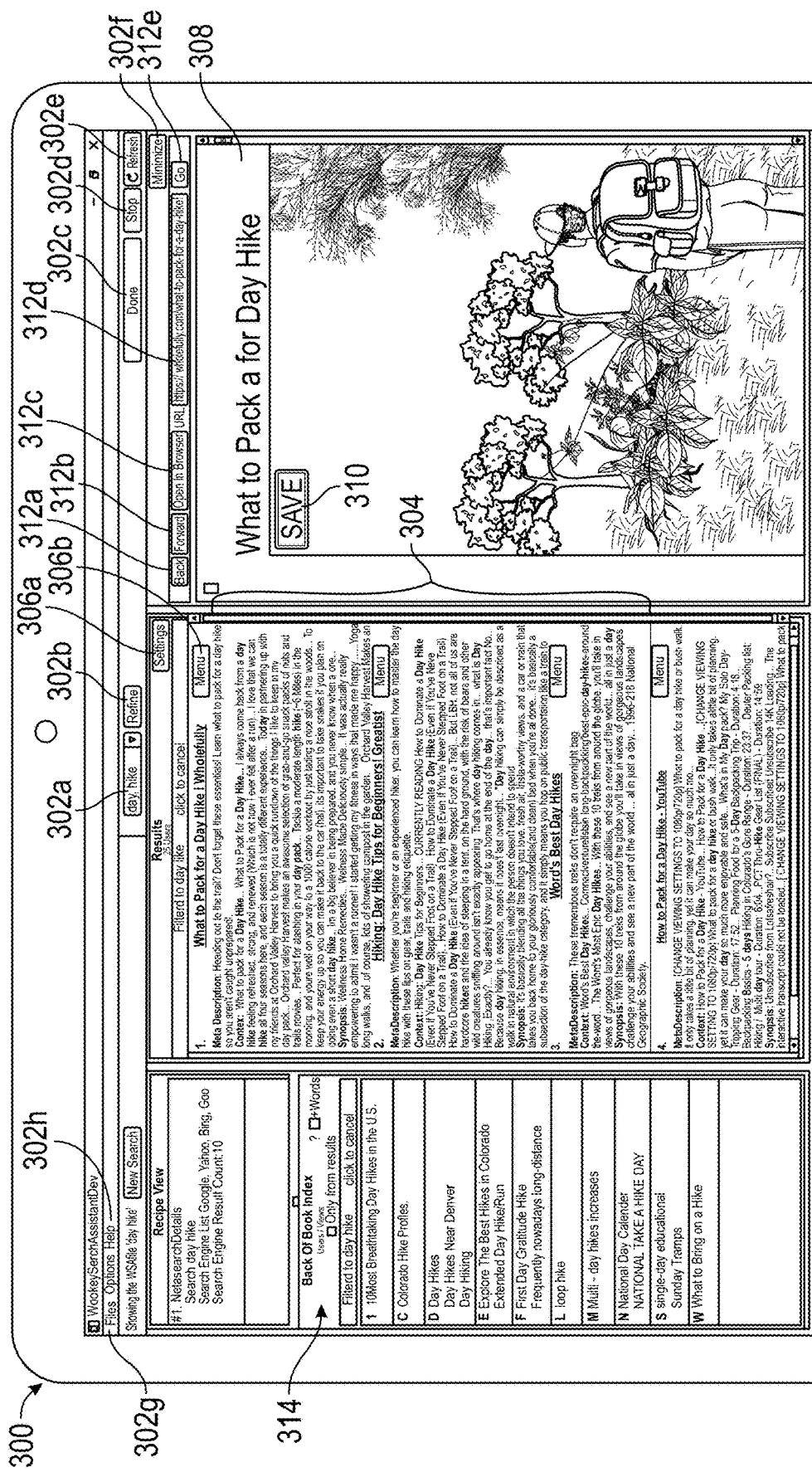
FIG. 3 is an example screen depicting a search result web page, in accordance with one or more exemplary embodiments.

FIG. 2, 200 discloses a First Computing Device or second computing device 102/104 of artificial intelligence optimized search system artificial intelligence artificial intelligence optimized search system
   201 Bus
   203 Database
   108 Optimized Search Engine of First Computing Device or second computing device 200
   205 Search Query Resolving Module,
   207 Template Selection Module,
   209 Content Providing Module
   110 Content Extraction Module of First Computing Device or second computing device 200
   211 Content Highlighting Module
   213 Content Deleting Module
   215 Feedback Module
   217 Simulation Module FIG. 3, 300 discloses an example screen of search result webpage
   302a query box 302a of webpage 300
   302b refine button of webpage 300
   302c done button of webpage 300
   302d stop button of webpage 300
   302e refresh button of webpage 300
   302f minimize button of webpage 300
   302g file button of webpage 300
   302h help button of webpage 300
   304 list of search results of webpage 300
   306a settings button of webpage 300
   306b menu button of webpage 300
   308 selected result webpage of webpage 300
   310 save button of webpage 300
   312 navigation bar of webpage 300
   314 saved phrase filter of webpage 300

Figure 4:
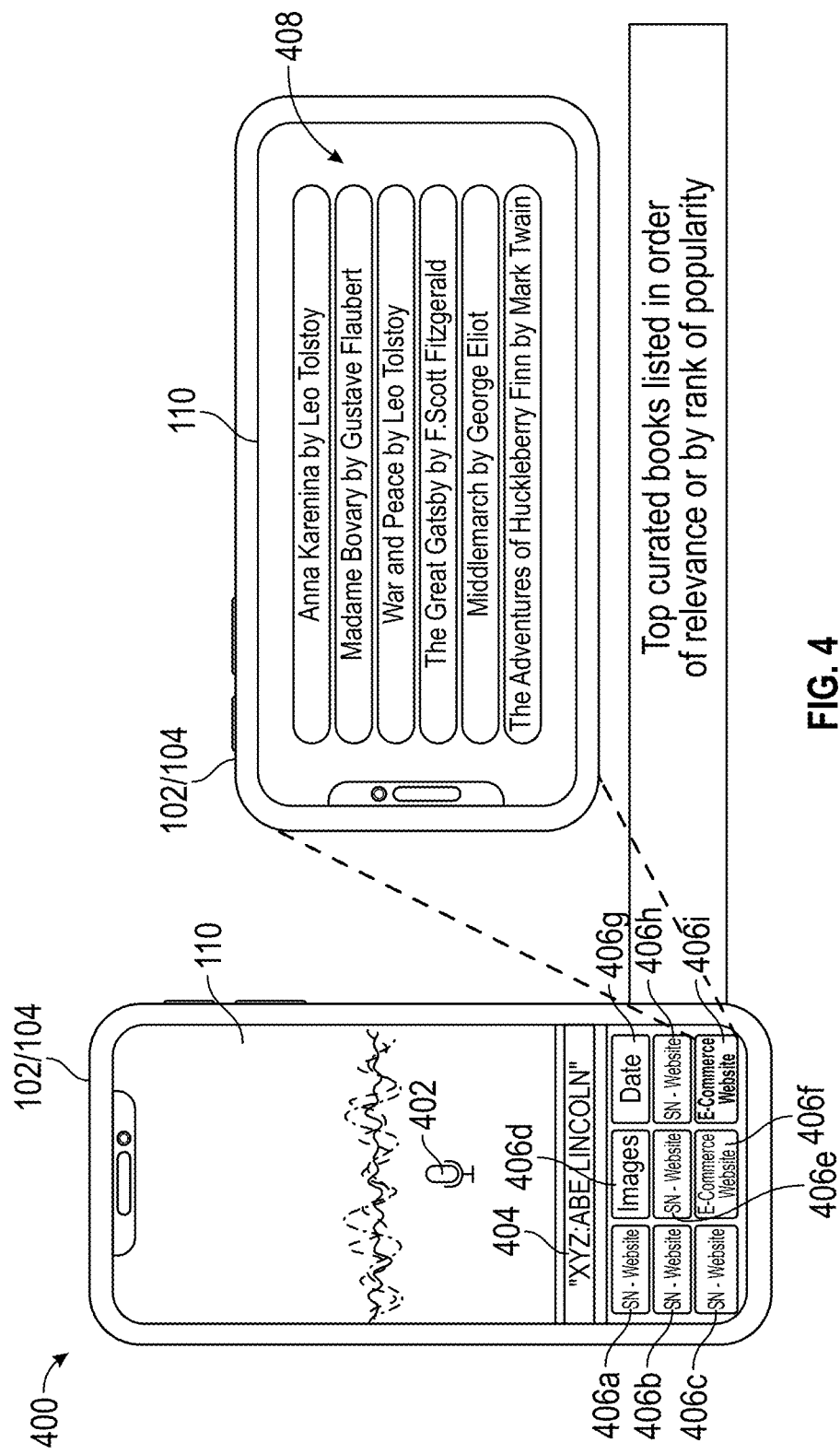
FIG. 4 is an example screen depicting an embodiment of the content extraction module on the first computing device and/or the second computing device, in accordance with one or more exemplary embodiments.
Figure 5:
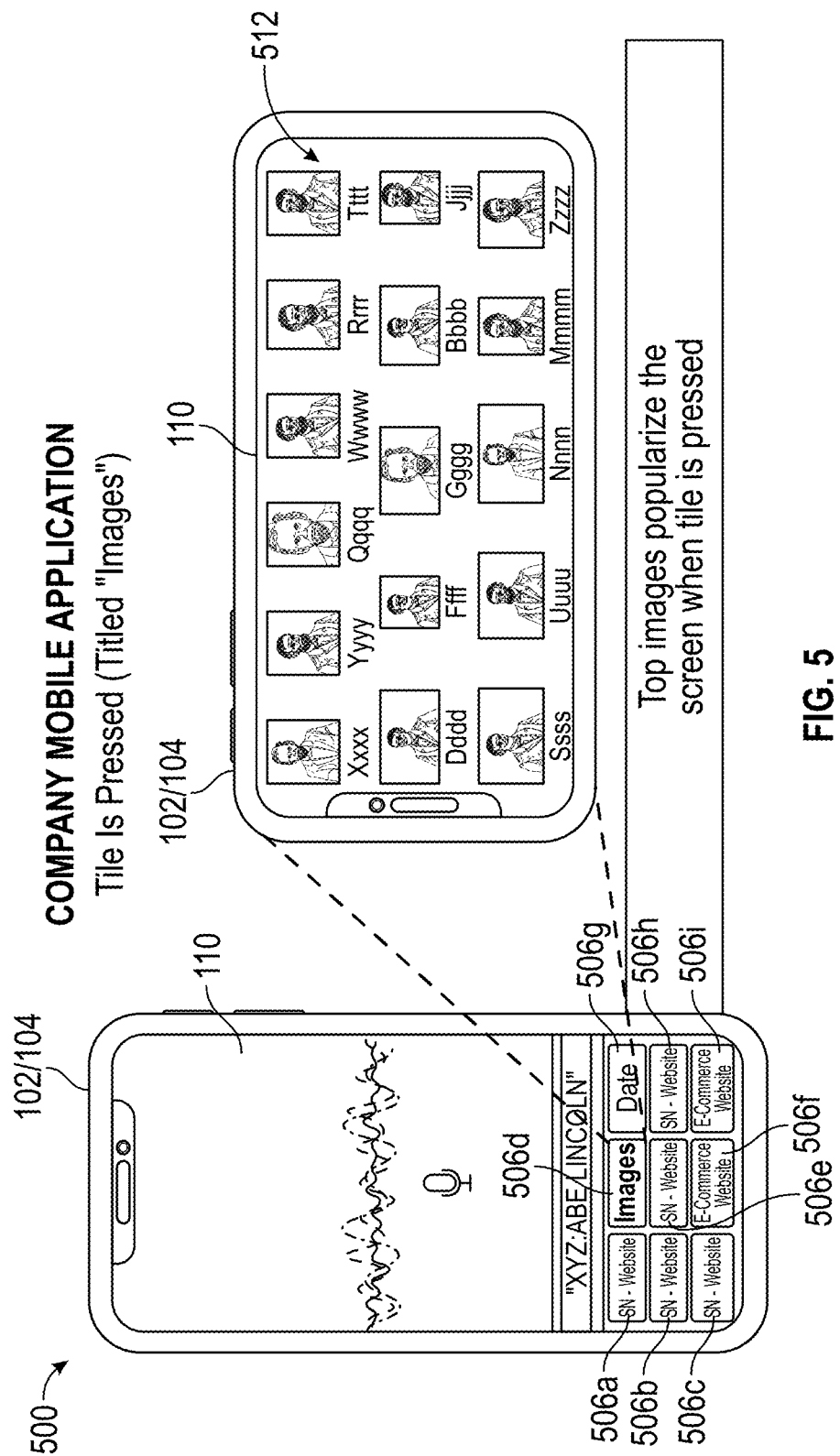
FIG. 5 is an example screen depicting another embodiment of the content extraction module on the first computing device and/or the second computing device, in accordance with one or more exemplary embodiments.
Figure 6:
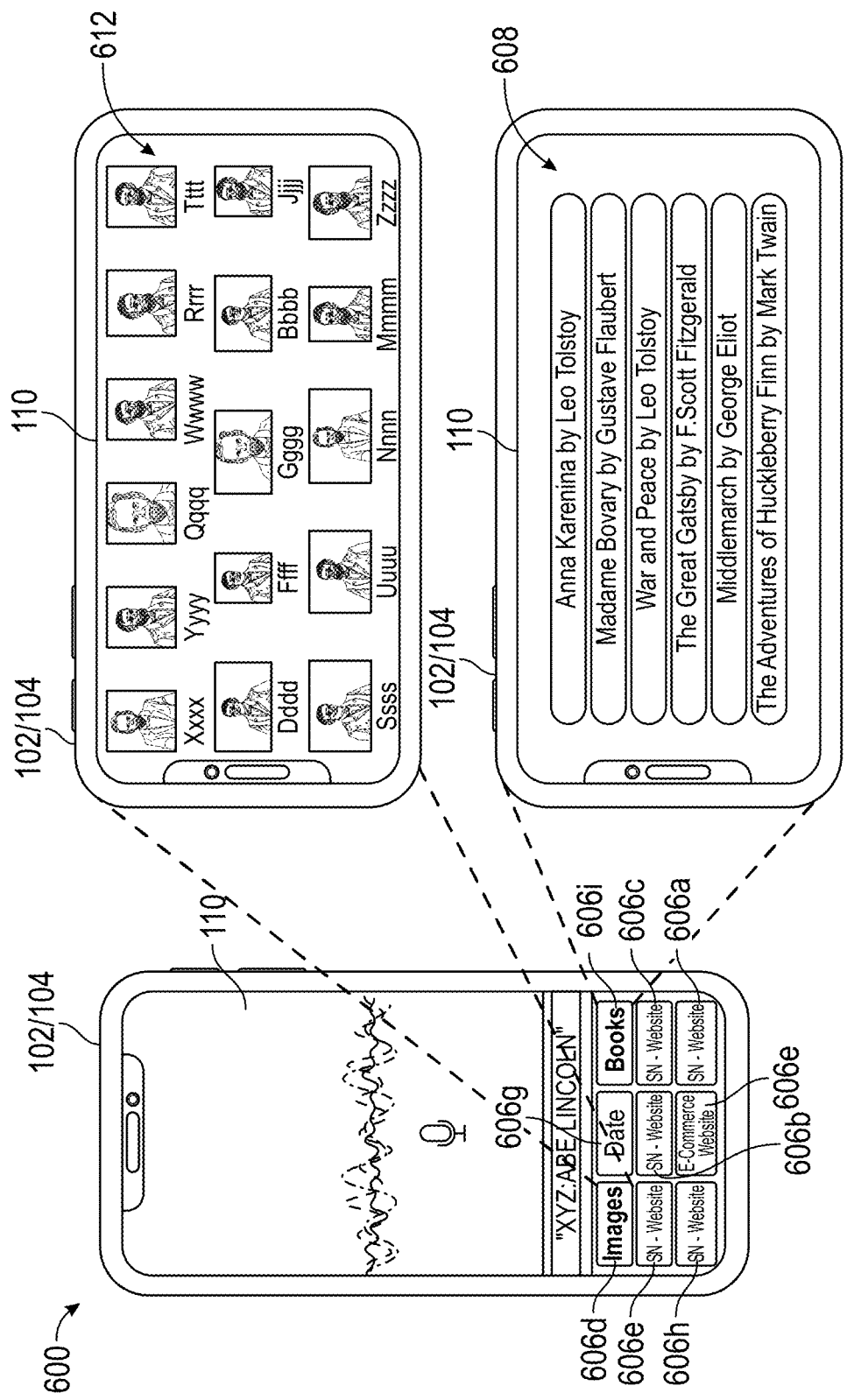
FIG. 6 is an example screen depicting another embodiment of the content extraction module on the first computing device and/or the second computing device, in accordance with one or more exemplary embodiments.
Figures 7A, 7B:
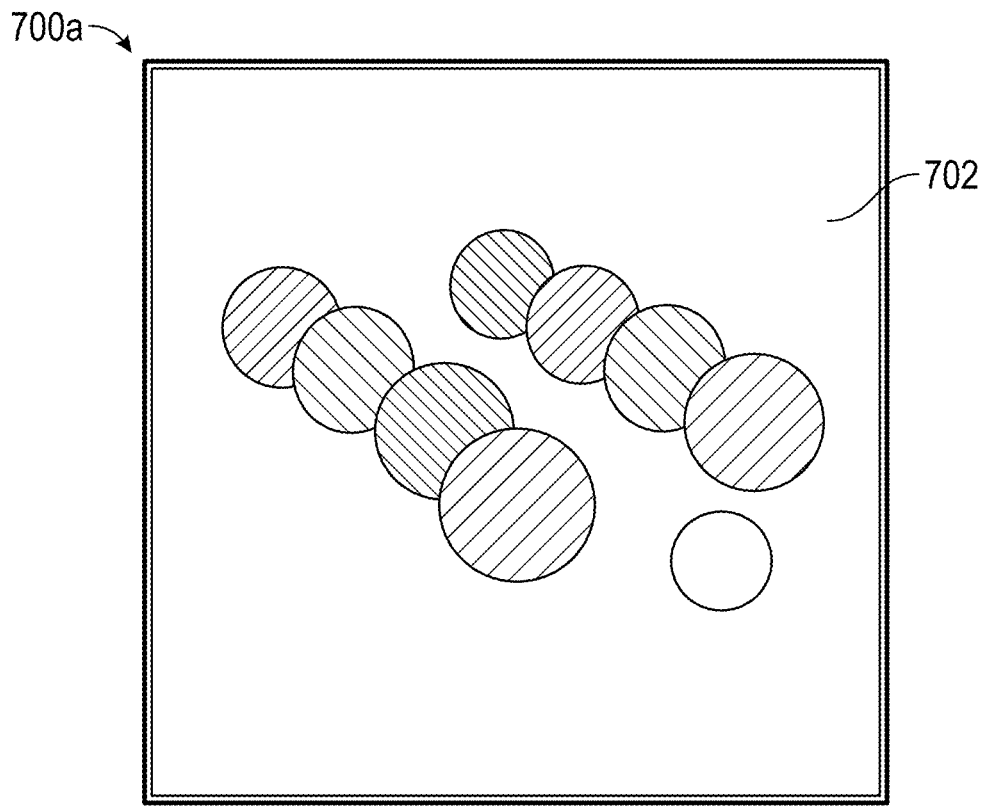
FIG. 7A, FIG. 7B, FIG. 7C, FIG. 7D, FIG. 7E are example diagrams depicting heat maps, in accordance with one or more exemplary embodiments.
Figure 7C:
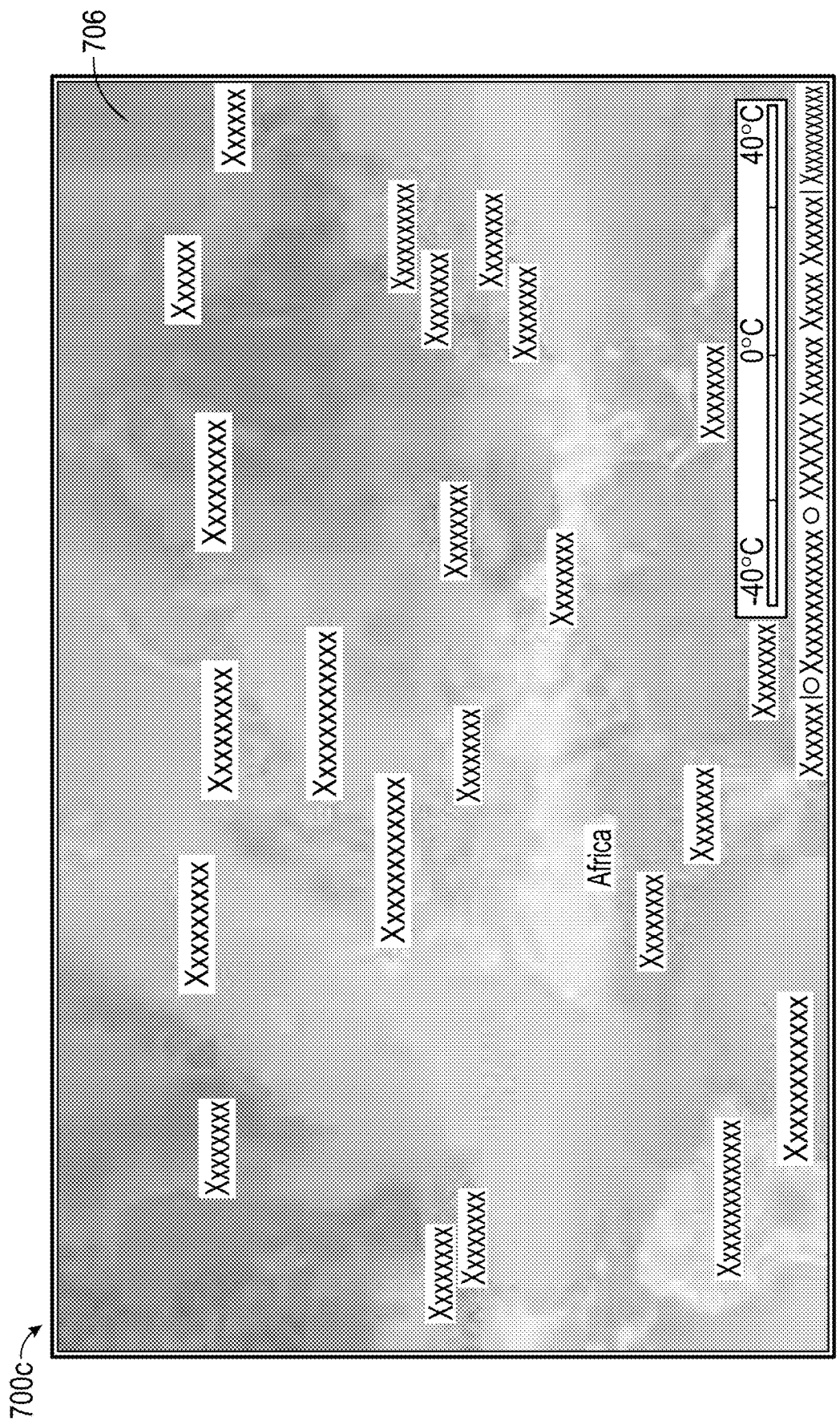
Figure 7D:
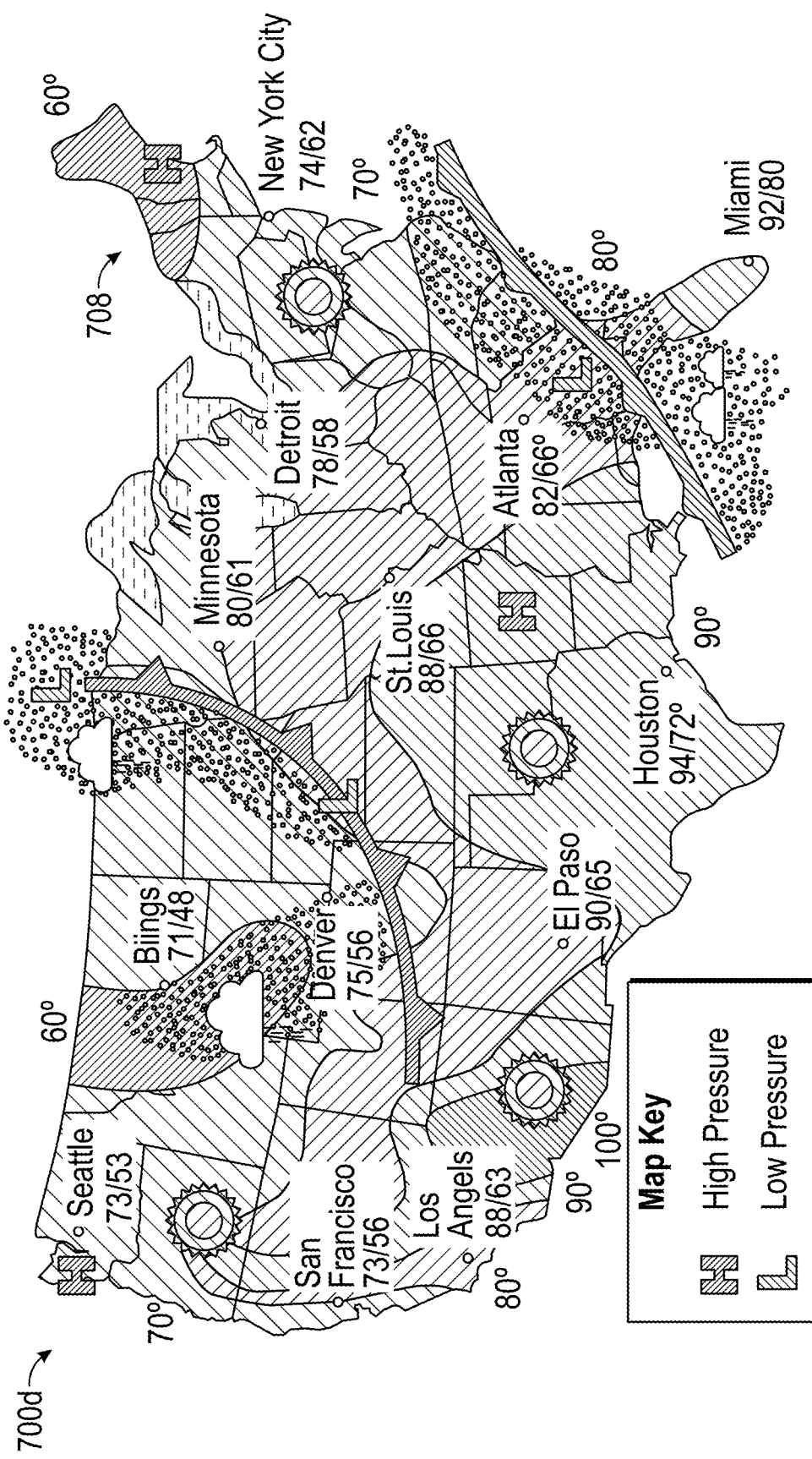
Figure 7E:
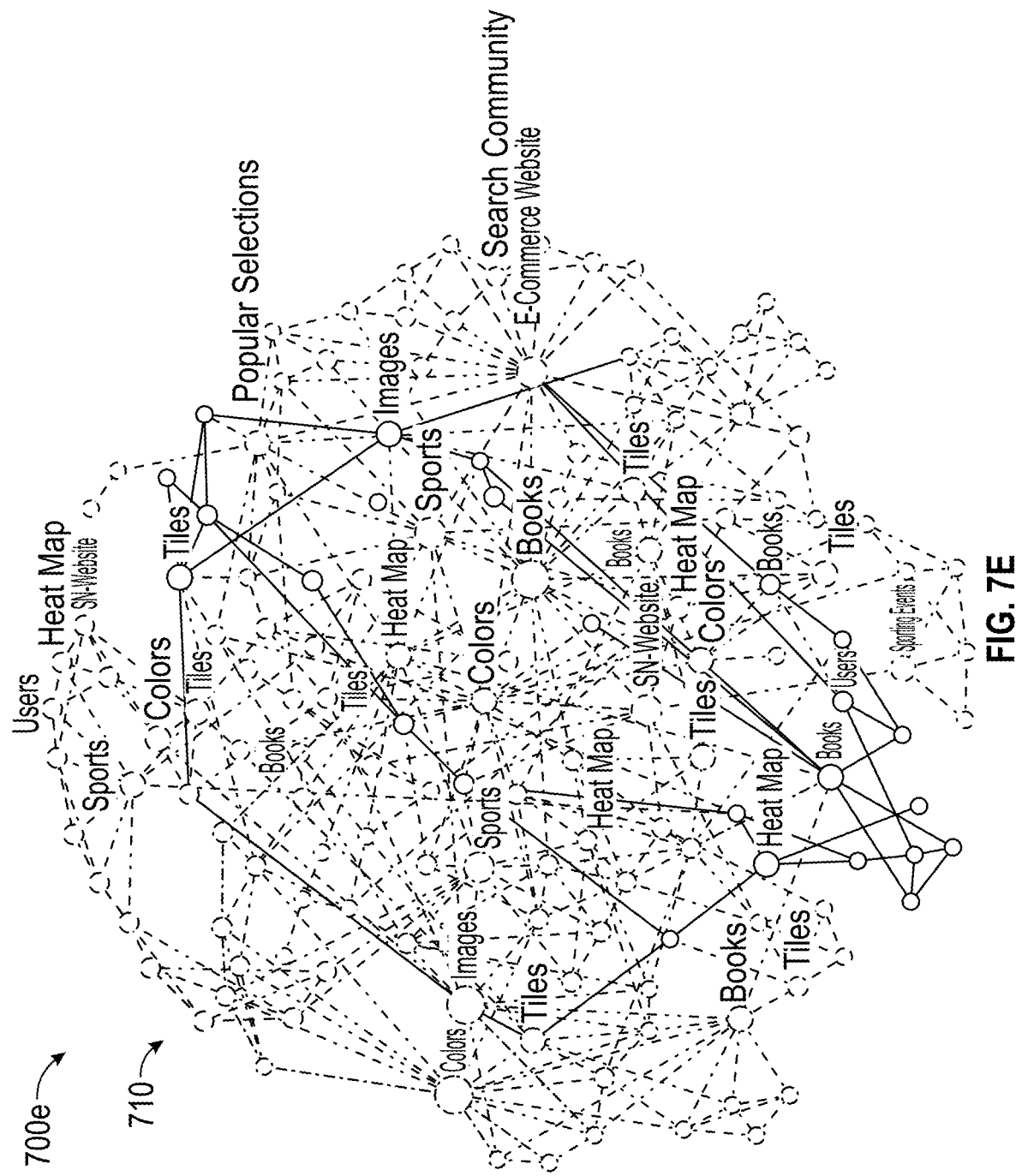
Figure 8:
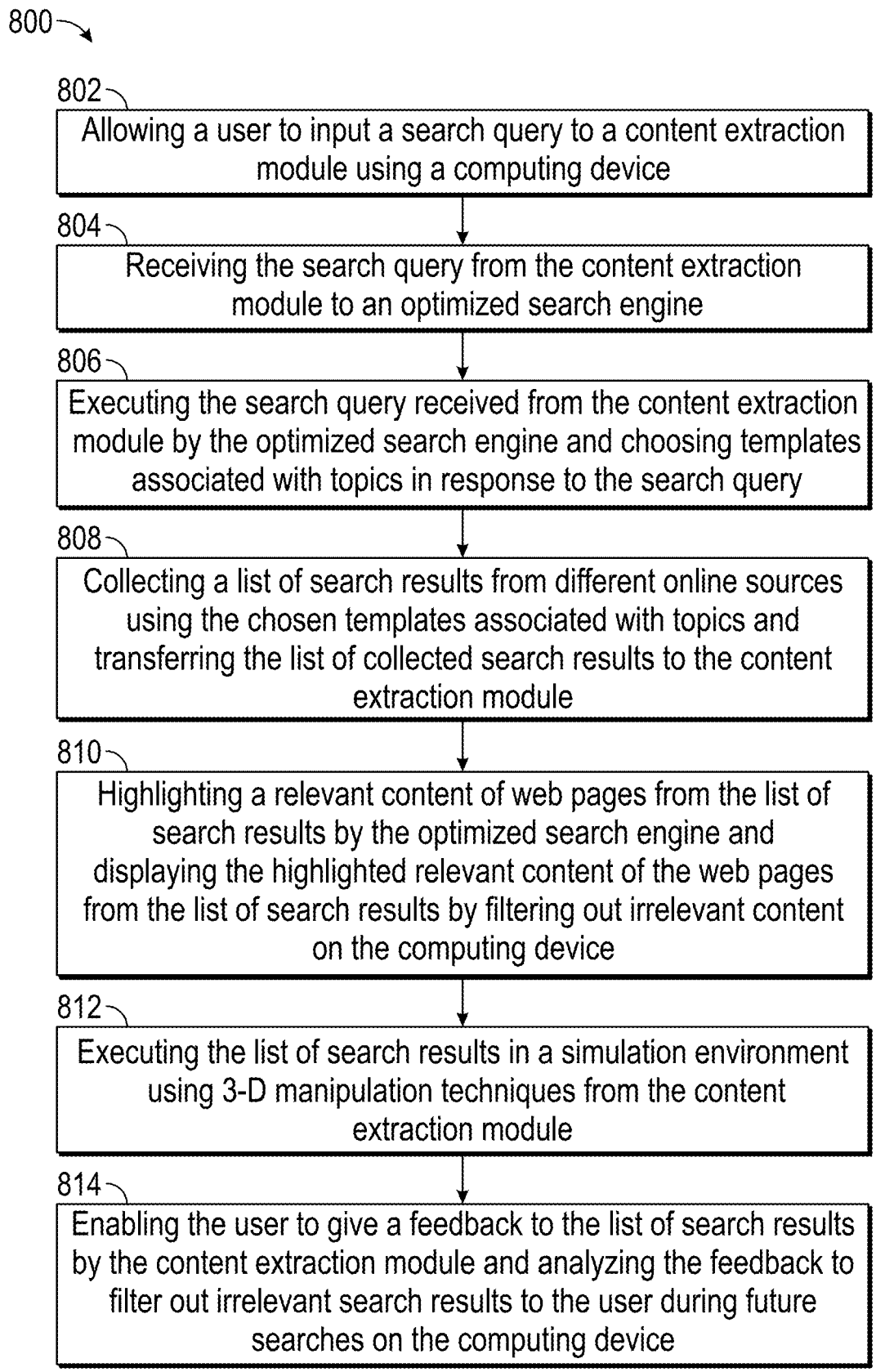
FIG. 8 is an example flow diagram depicting a method for providing relevant content in response to the search query, in accordance with one or more exemplary embodiments.
Figure 9:
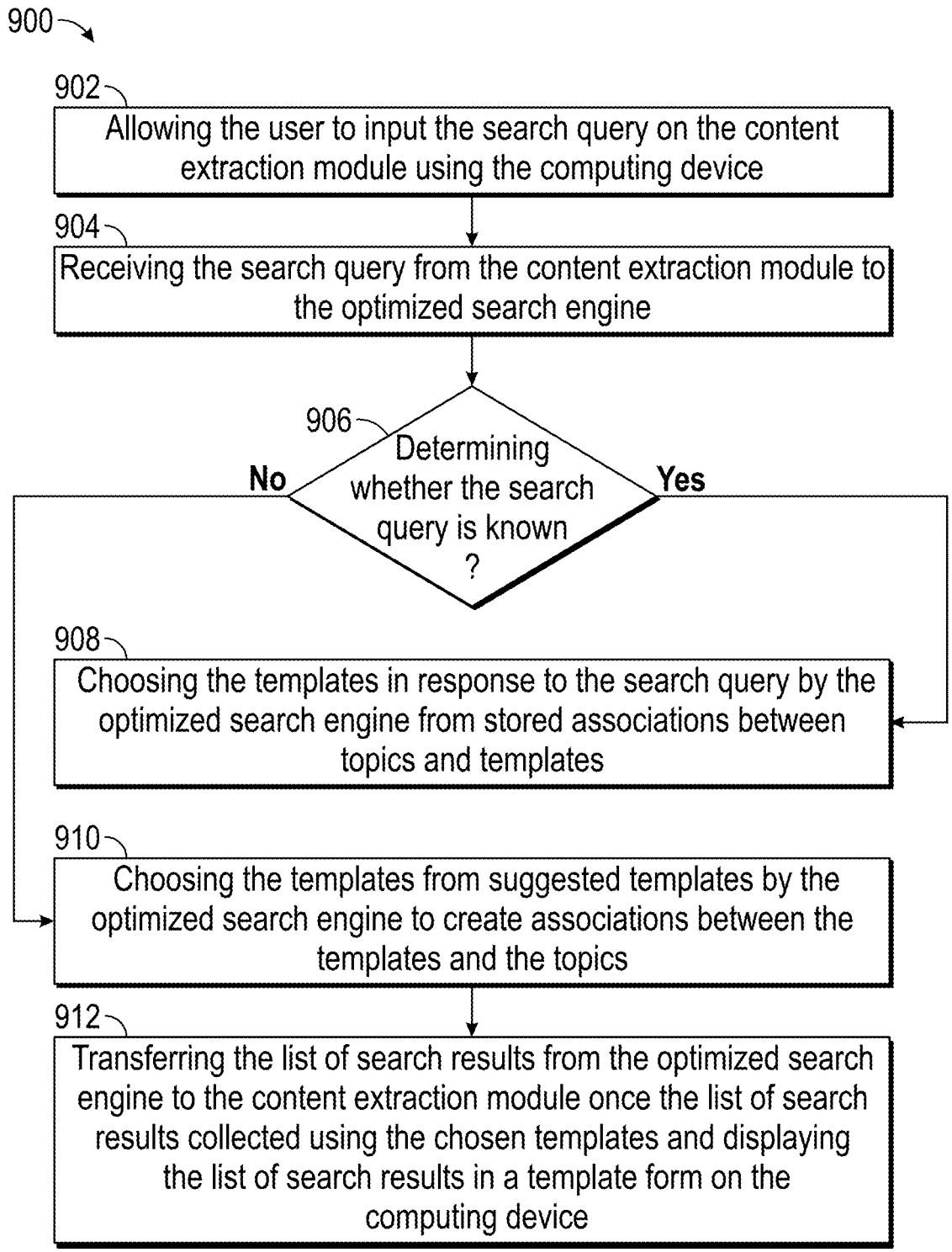
FIG. 9 is an example flow diagram depicting a method for displaying the search results in the template form in response to the search query, in accordance with one or more exemplary embodiments.

FIG. 4, 400 discloses a screen depicting an embodiment of the content extraction module
   402 voice assistant of content extraction module 400
   404 search bar of content extraction module 400
   406a, 406b, 406c, 406d, 406e, 406f, 406g, 406h, 406i tiles
   408 list of books FIG. 5, 500 discloses another screen depicting another embodiment of the content extraction module
   506a, 506b, 506c, 506d, 506e, 506f, 506g, 506h, and 506i tiles
   512 list of images FIG. 6, 600 discloses another screen depicting another embodiment of the content extraction module
   606a, 606b, 606c, 606d, 606e, 606f, 606g, 606h, and 606i Tiles
   608 list of books
   612 list of images FIG. 7, 700 discloses heat maps
   702 first heat map,
   704 second heat map,
   706 third heat map,
   708 fourth heat map,
   710 fifth heat map FIG. 8, 800 discloses a method for providing relevant content in response to the search query
   802 Allowing a user to input a search query to a content extraction module using a computing device
   804 Receiving the search query from the content extraction module to an optimized search engine
   806 Executing the search query received from the content extraction module by the optimized search engine and choosing templates associated with topics in response to the search query
   808 Collecting a list of search results from different online sources using the chosen templates associated with topics and transferring the list of collected search results to the content extraction module
   810 Highlighting a relevant content of web pages from the list of search results by the optimized search engine and displaying the highlighted relevant content of the web pages from the list of search results by filtering out irrelevant content on the computing device 812 Executing the list of search results in a simulation environment using 3-D manipulation techniques from the content extraction module 814 Enabling the user to give a feedback to the list of search results by the content extraction module and analyzing the feedback to filter out irrelevant search results to the user during future searches on the computing device FIG. 9, 900 discloses a method for displaying the search results in the template form in response to the search query 902 Allowing the user to input the search query to the content extraction module using the computing device 904 Receiving the search query from the content extraction module to the optimized search engine 906 Determining whether the search query is known?

Figure 10:
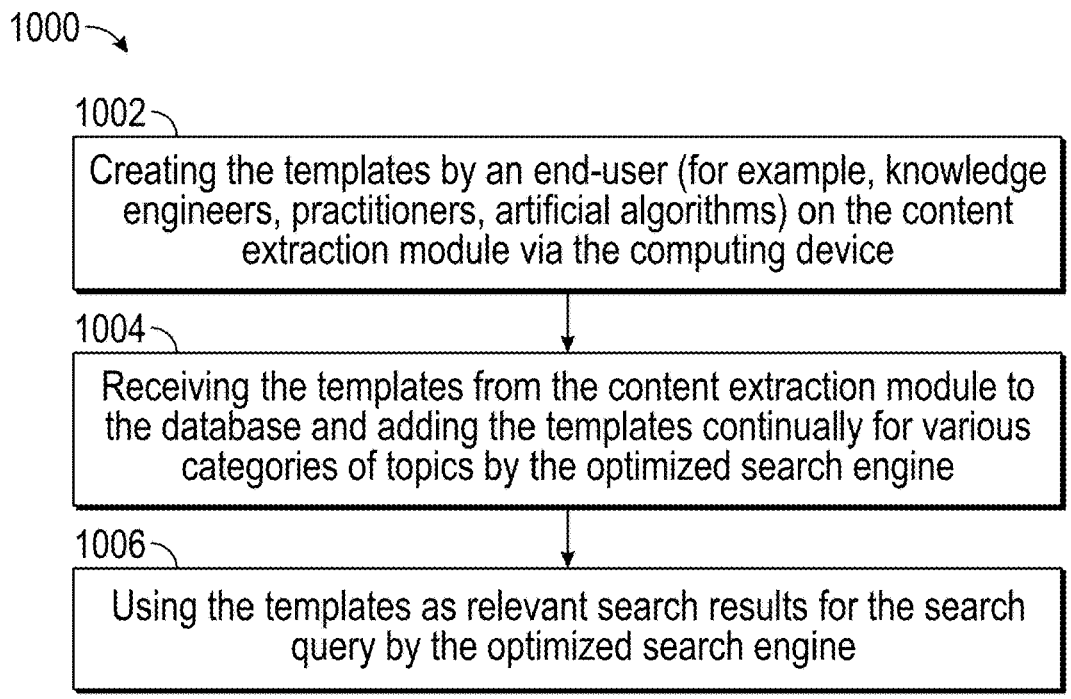
FIG. 10 is an example flow diagram depicting a method for using the templates as relevant search results for the search query, in accordance with one or more exemplary embodiments.
Figure 11:
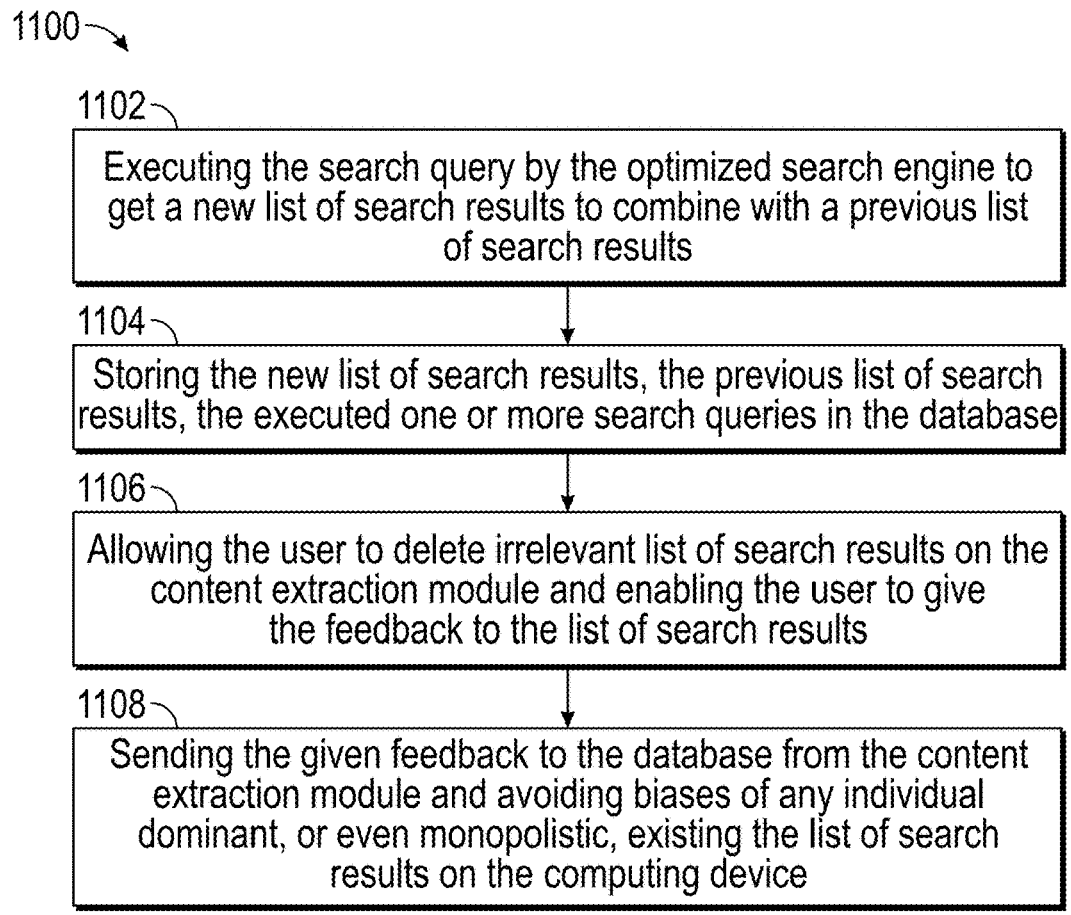
FIG. 11 is an example flow diagram depicting a method for allowing the user to delete irrelevant list of search results and enabling the user to give the feedback, in accordance with one or more exemplary embodiments.
Figure 12:
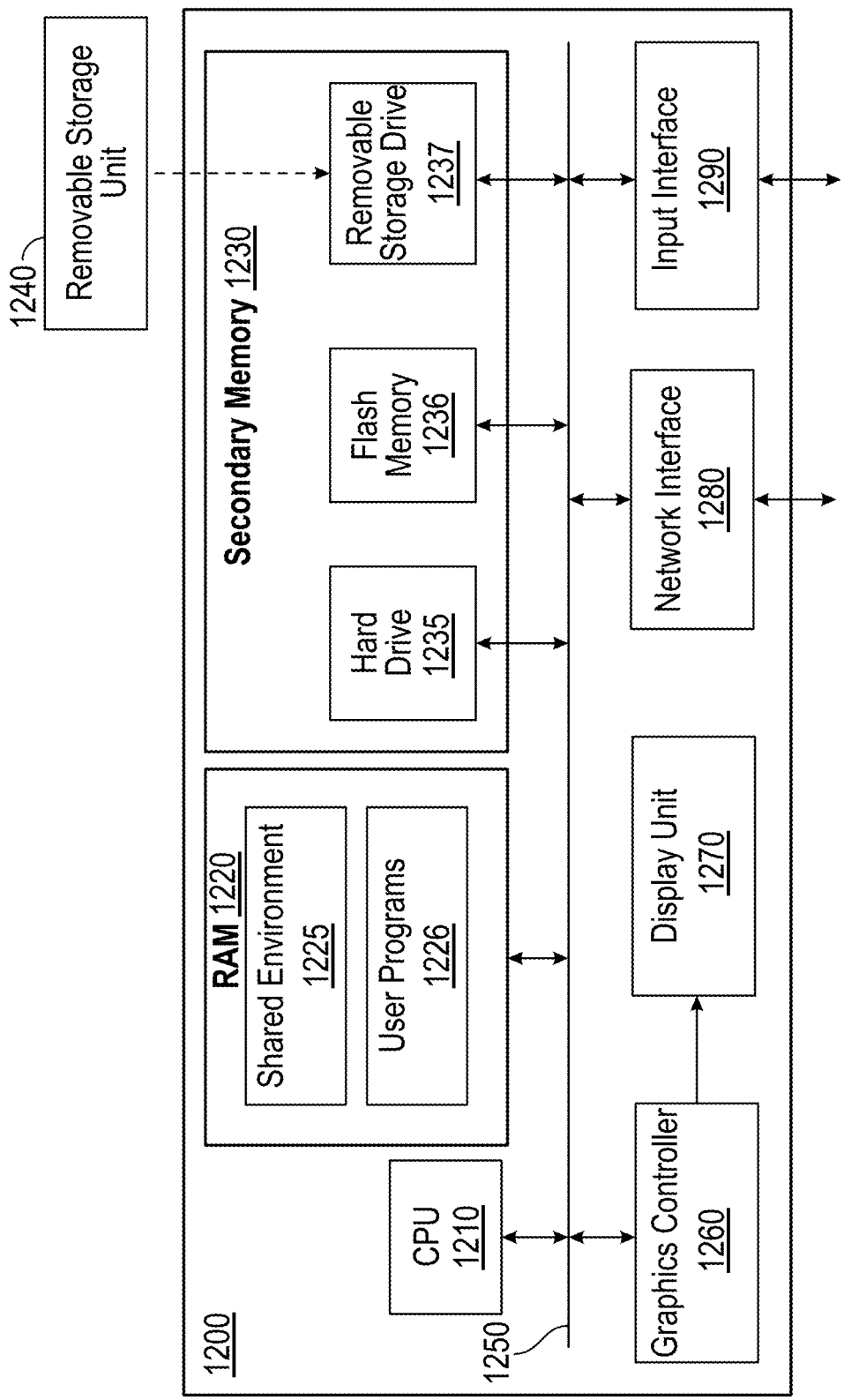
FIG. 12 is a block diagram illustrating the details of digital processing system in which various aspects of the present disclosure are operative by execution of appropriate software instructions.
Figure 13:
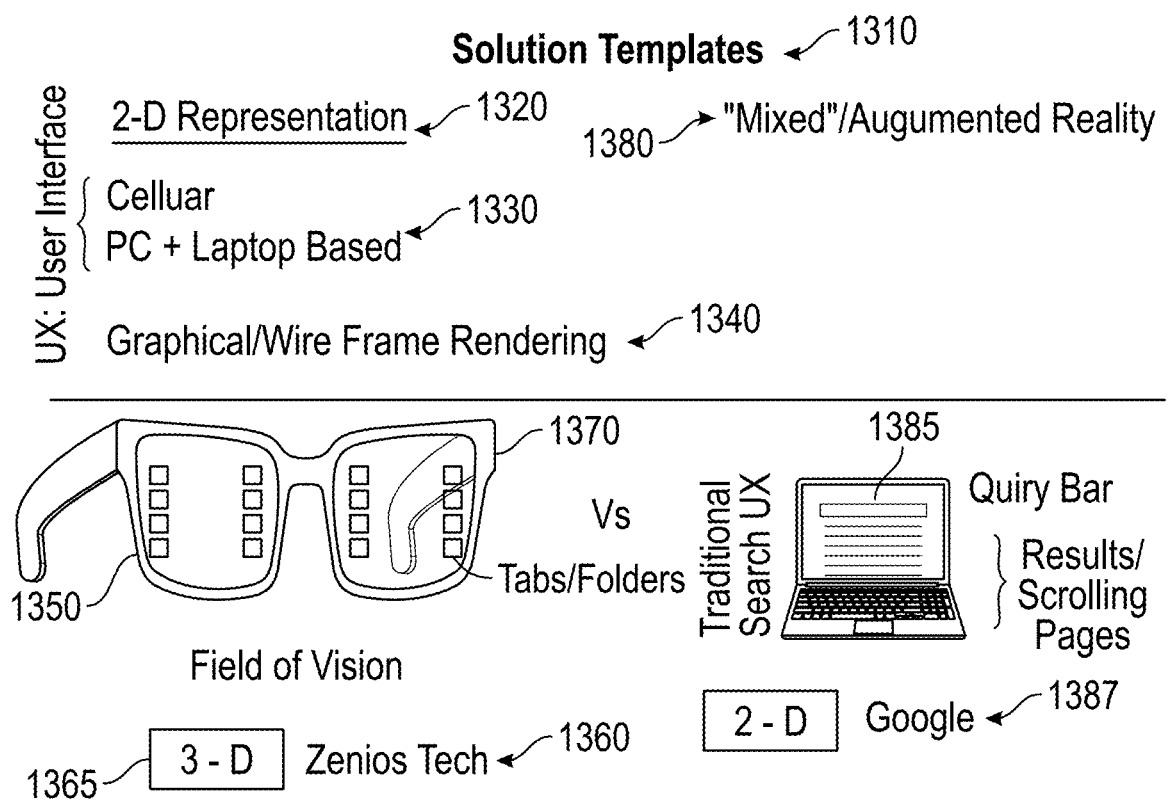
FIG. 13 is a block diagram illustrating various mixed and augmented reality display solutions.

906 is YES, 908, Choosing the templates from stored associations of the database between topics and templates by the optimized search engine 906 is NO, 910, Choosing the templates from suggested templates of the database by the optimized search engine to create associations between the templates and the topics 912 Transferring the list of search results from the optimized search engine to the content extraction module once the list of search results collected using the chosen templates and displaying the list of search results in a template form on the computing device FIG. 10, 1000 discloses a method for using the templates as relevant search results for the search query 1002 Creating the templates by the user (for example, knowledge engineers, practitioners, artificial algorithms) on the content extraction module via the computing device 1004 Receiving the templates from the content extraction module to the database and adding the templates continually for various categories of topics by the optimized search engine 1006 Using the templates as relevant search results for the search query by the optimized search engine FIG. 11, 1100 discloses method for allowing the user to delete irrelevant list of search results and enabling the user to give the feedback 1102 Executing the search query by the optimized search engine to get a new list of search results to combine with a previous list of search results 1104 Storing the new list of search results, the previous list of search results, the executed one or more search queries in the database 1106 Allowing the user to delete irrelevant search results on the content extraction module and enabling the user to give the feedback to the list of search results 1108 Sending the given feedback to the database from the content extraction module and avoiding biases of any individual dominant, or even monopolistic, existing the list of search results on the computing device FIG. 12—digital processing system corresponds to the computing device 1210 CPU
1220 Random Access Memory (RAM)
1225 Shared Environment of RAM 1220
1226 User Programs of RAM 1220
1230 Secondary Memory
1235 Hard Drive of secondary Memory 1230
1236 Flash Memory of secondary Memory 1230
1237 Removable Storage Drive of secondary Memory 1230
1240 Removable Storage Unit
1250 Communication Path
1260 Graphics Controller
1270 Display Unit
1280 Network Interface
1290 An Input Interface

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a block diagram 100 representing an artificial intelligence optimized search system in which aspects of the present disclosure can be implemented. Specifically, FIG. 1 depicts a schematic representation of the artificial intelligence optimized search system for providing content in response to search queries, in accordance with one or more exemplary embodiments. The artificial intelligence optimized search system 100 includes a first computing device 102, and a second computing device 104 operatively coupled to each other through a network 106. The network 106 may include, but is not limited to, an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and the like without limiting the scope of the present disclosure. The system 100 is preferably realized as a computer-implemented system in that the first and second computing devices (102, 104) are configured as computer-based electronic devices.

Although the first and second computing devices 102, 104 are shown in FIG. 1, an embodiment of the system 100 may support any number of computing devices. The system 100 may support only one computing device (102 or 104). The computing devices 102, 104 may include, but are not limited to, a desktop computer, a personal mobile computing device such as a tablet computer, a laptop computer, or a netbook computer, a smartphone, a video game device, an augmented reality device, a virtual reality device, a digital media player, a piece of home entertainment equipment, backend servers hosting database and other software, and the like. Each computing device 102, 104 supported by the system 100 is realized as a computer-implemented or computer-based device having the hardware or firmware, software, and/or processing logic needed to carry out the intelligent messaging techniques and computer-implemented methodologies described in more detail herein. The first computing device 102 and/or the second computing device 104 may be configured to display features by an optimized search engine 108. The features may be helpful to find out relevant content on the first computing device 102 and/or the second computing device 104. The first computing device 102 and/or the second computing device 104 may be operated by users. The users may include, but not limited to, individuals, bloggers, authors, knowledge engineers, practitioners, content creators, employees, stakeholders, advertisers, content providers, sponsors, organizations, experts, and the like. The first computing device 102 and the second computing device 104 may be operated by users.

The first computing device 102 and the second computing device 104 may include a content extraction module 110 which is accessed as a mobile application, web application, software that offers the functionality of mobile applications, and viewing/processing of interactive pages, for example, are implemented in the first and second computing devices 102, 104 as will be apparent to one skilled in the relevant arts by reading the disclosure provided herein. For example, the first computing device 102 includes the content extraction module 110 (for example, mobile application) downloaded from a cloud server (not shown). Whereas the second computing device 104 may be directly accessed the content extraction module 110 (for example, web application). The content extraction module 110 may be any suitable application downloaded from GOOGLE PLAY® (for Google Android devices), Apple Inc.'s APP STORE® (for Apple devices), or any other suitable database. In some embodiments, the content extraction module 110 may be software, firmware, or hardware that is integrated into the first and second computing devices 102 and 104. The content extraction module 110 may be an artificial intelligence powered, need-based, or social networking service to enable real-time search results.

The first computing device 102 and/or the second computing device 104 may be configured to allow users to build templates on the content extraction module 110. The templates may be continually added for categories of topics. The categories of topics may include, but not limited to, celebrities, actors, sports figures, historical figures, ticker research, a list of new stories, a formatted set of stories, and the like. The users who take the time to learn the templates for preserving and apply expert knowledge in search, may become authors and produce templates on topics of interest, and then offer these templates for sale to other users. The users may able to put out ideas of things they would like help finding. The user may re-run the template in the future on the first computing device 102 and/or the second computing device 104, refreshing the information already found with new links whenever they want new information. The optimized search engine 108 is generally configured to store, maintain, and execute software programs, such as artificial intelligence and machine learning programs, database (203 shown in FIG. 2) that includes predefined templates.

The database (203 shown in FIG. 2) includes verticals, whereas each vertical has many templates defining how to organize different kinds of searches relevant to that vertical. The content extraction module 110 may enable the user to create associations between the templates and the topics on the first computing device 102 and/or the second computing device 104. A template may be used to find and organize information for many related topics. The content extraction module 110 may also be configured to allow the authors creating improvements and other daily information for the users. The content extraction module 110 may include a catalog of improvement module descriptions. The content extraction module 110 may include a personal improvement platform app that downloads a user chosen set of modules. The content extraction module 110 may be the symbolism and tokenization of words to create a universal understanding of knowledge.

The optimized search engine 108 may be configured to suggest search queries and the list of search results to the content extraction module 110 in response to user queries. The optimized search engine 108 includes pioneering techniques to present the list of search results in a simulation environment using three-dimensional (3-D) manipulation techniques. The simulation environment may include, but not limited to, an augmented reality environment, a virtual reality environment, a mixed reality environment, and the like. The list of search results may be unbiased and arranged by relevance to the user. The optimized search engine 108 may be configured to bridge the gap between current generation mobile users and the virtual reality, and augmented reality, consumption of search results and information of the near future. The users are able to customize or collaborate on the list of search results on the first computing device 102 and/the second computing device 104 through the content extraction module 110. The optimized search engine 108 may be configured to execute the search queries received from the content extraction module 110 to get a new list of search results to combine with a previous list of search results. The optimized search engine 108 may also be configured to remember the previous list of search results that may be hidden in the future by the new list of search results. The users may easily delete irrelevant search results on the content extraction module 110 through the first computing device 102 and/or the second computing device 104. The optimized search engine 108 remembers the online sources which may be chosen by the users.

The optimized search engine 108 may be configured to help the users avoid the biases of any individual dominant, or even monopolistic, an existing provider of the list of search results. For example, content providers, who have been hurt by the biases, and blacklists, of existing search result providers, the optimized search engine 108 may be the obvious partner for indexing the existing sources of content. The optimized search engine 108 enables those content providers a way to recover their market shares, revenues, and have a better connection with their user communities. The users spend their money with the optimized search engine 108 on better prospects for goods, services, and other information provided. For example, the simulation environment may bring shoppers to a virtual mall of their design, or augmented reality allows shoppers to try on clothes without changing by showing a mirror like image.

The first computing device 102 and/or the second computing device 104 may allow the user to input the search queries to the content extraction module 110. The optimized search engine 108 may be configured to receive the search queries and choose the templates from remembered associations between topics and templates when the search queries are known. The optimized search engine 108 may also be configured to choose the templates from suggested templates to create associations between templates and topics when the search queries are unknown. For example, if a user entered the text such as a goal of remodel house in the content extraction module 110, then the content extraction module 110 suggests the search queries, results, and new modules to support the user's goal. The results displayed in the content extraction module 110 in a template form. The content extraction module 110 may include a gamification model where the users earn and use credits. Users may not have to log in to use the content extraction module 110, but it would entice the users to create an account by offering additional benefits. The content extraction module 110 may also be configured to allow the users to earn the credits by exploring, including on a consecutive daily basis via a gamification reward to create stickiness. The content extraction module 110 may also be configured to respond to in-app incentives to view ads. The credits of the content extraction module 112 may be used to get rid of the advertising bar, request and store custom searches, sponsor providers of favored content to get better placement in Micropayments to support good content, enticing users to create an account. The content extraction module 110 may be available and usable even for those who opt out of creating an account. The content extraction module 110 may make money from those who prefer to create the account, and also from information sources. With the account, the users may link the computing device 102/104 and the content extraction module 110 use to share information in the manner they would want to share it.

The content extraction module 110 may be configured to track user accounts, credits, use, enticement, management/tracking, spidering and cache building, content ranking components, content writing components, and the like. The content extraction module 110 may also be configured to allow the user on the first computing device 102 and/or the second computing device 104 to track search history (for the user's benefit), share search history and personal notes on searches between devices, create separate category lists of searches (like collections of saved posts on social media websites, easily returning to previous searches being notified when previous topics of interest are updated with additional information (via template changes, refresh spidering, etc.). The search history may be at the user's control to edit or delete. The user may create private shareable search templates, and request searches on demand or automatically on a schedule.

The content extraction module 110 may be configured to create multiple delivery options with other mediums and interactions with potential consumer bases, this allows for exponential corporate growth in delivering a complimentary brand image. The content extraction module 110 includes visual navigation, with its intuitive tile iconography for categories or fields of interest, allows the user to more easily recognize where they want to go with light imaging overlay, it is a design that translates easily to the augmented reality/virtual reality way of the future. The content extraction module 110 may also be configured to increase research among the users, provide the ability to make granular and generic searches with ease and comfort through the multi-source search query and its unique UI/UX design. Accordingly, learning the user's behavior and interests may help to yield more refined insights across the first computing device 102 and/or the second computing device 104.

For example, the content extraction module 110 has several approaches to monetization, including revenue from user activity generating traffic, mobile marketing campaigns, basic versions of the mobile search app (free to users with an advertising bar), including revenue without requiring user signup, template marketplace, providing optimized list of search results to other apps. Modularizing certain features into libraries can license to other apps. Advertising access (both leased and sold). The sale of tiles/keywords (including from variable fixed-price auctions). The tiles may include a software networking website, images, an E-commerce website, a list of books, and the like. The lease or sale of content publisher indexing partnerships, knowledge worker seats, corporate intranet knowledge portals. The content extraction module 110 may be configured to allow the users to provide organizing information and also to explore that organized information on the first computing device 102 and/or the second computing device 104. For example, the content extraction module 110 sells content publishers a package for building superior exploration portals to help their users explore the publisher's content. The packages include support by experienced users in creating templates that organize user knowledge, indexing user content for relevancy and related audiences. The packages may include the preferred placement of results for that content publisher in other topics indexed throughout a variety of vertical portals. What's more, based on the editorial bias of the package, the content may receive featured organic style placement in the content extraction module 110 via user-selected, bias-driven results. Organizations may benefit from the content extraction module 110 portal package, including news sites, think tanks, science organizations, scientific journals, authors (providing a cross-book index of all their writing), political organizations (providing papers presenting the specific positions of a candidate, coalition, or party), and the like. The content extraction module 110 may not be configured to provide simply indexing of "data" that is not always relevant, or impossible to replicate. The content extraction module 110 may provide rich, accurate, and fast resourcing by aggregating the list of search results to search queries across various templated tiles. The content extraction module 110 may be based on timeless, extensive usage and behavior patterns.

The content extraction module 110 includes a heat map in response to how often users select certain tiles that allow the users to participate in a given search community on the first computing device 102 and/or the second computing device 104. For instance, the users who regularly search sports will see the heat map during major sporting events. The heat map may include colors behind the tiles so that users can identify the more popular selections. The heat map acting as a directional compass is interesting and makes it fun for the user to reinforce the 'discoverers delight' etc.

The optimized search engine 108 may be configured to take the sharing of information from a static web portal to an interactive user base. Its index and look-up work is not the way of the future, but the past instead that needs to be built upon as an interactive portal. Similarly, search as a communication tool can help humans define what they don't know—that is, what they cannot see—with the implication of expanding human thought while gaining value from one's efforts. The optimized search engine 108 may also be configured to render a quicker response to search queries, make them more fluid when it comes to sharing information. The optimized search engine 108 may apply knowledge with both paid, indexed, and directory generated content based on rules within the templates that select the list of search results. The optimized search engine 108 may provide tools that allow the users to share templated answers to broad categories of search queries. The optimized search engine 108 may allow for the monetization of the search query beyond hidden advertisers' agendas. With the content extraction module 110, the user earns rewards or money for searching and for assisting others who are not skilled in writing a good search query. The content extraction module 110 may create a safe place for the sharing of ideas with bias and diversity in balance. The content extraction module 110 may also be configured to allow the users to sell the tiles as a licensing-type model with various franchises (sports franchises). The licensing with corporate sponsors for various items may include, but not limited to, the baseball-related tiles for the cost of a long-tail search. For example, a tile the San Francisco Giants may sponsor can generate additional revenue from a commission partnership or reseller offering Giants jerseys.

Referring to FIG. 2, FIG. 2 is a block diagram 200 depicting a schematic representation of the first computing device 102 and/or the second computing device 104 shown in FIG. 1, in accordance with one or more exemplary embodiments. The first computing device 102 and/or the second computing device 104 may include the content extraction module 110, the optimized search engine 108, a bus 201, and a database 203. The optimized search engine 108 includes a search query resolving module 205, a template selection module 207, and a content providing module 209. The content extraction module 110 includes a content highlighting module 211, a content deleting module 213, a feedback module 215, and a simulation module 217. The bus 201 may include a path that permits communication among the modules of the optimized search engine 108 and the modules of the content extraction module 110. The term "module" is used broadly herein and refers generally to a program resident in memory of the computing device 102 or 104. The optimized search engine 108 and the content extraction module 110 may be communicated with the database 203.

The content extraction module 110 may include heat maps configured to show the popular, relevant, and important list of search results in response to the search queries on the first computing device 102 and/or the second computing device 104. The search query resolving module 205 may be configured to resolve the received search query from the content extraction module 110. For example, the search query may include the life of a president who may direct the search under refinements such as life, political career, books and videos about the president, and the like.

The template selection module 207 may be configured to select the templates in response to the search query. The template may be used to find and organize relevant content associated with relevant topics. If the search query is known, the template selection module 207 may select the templates from stored associations between topics and the templates. The associations may be created between the templates and the topics by the user and add those associations to the database 203. If the search query is unknown, the template selection module 207 may select from suggested templates to create associations between the templates and the topics. The template selection module 207 may include artificial intelligence techniques within the templates to provide a revolutionary way to combine the search queries from many sources and filter out irrelevant information. The template selection module 207 may be configured to allow the users to build and add the templates for various categories of topics on the first computing device 102 and/or the second computing device 104. The template selection module 207 may also be configured to allow the user to provide the knowledge about searching, and apply the template across many related topics to find highly relevant content for the users.

The content providing module 209 may be configured to provide the relevant content in the form of the templates to the content extraction module 110. The content providing module 209 may also be configured to suggest the search queries and the relevant content in response to the search queries to the content extraction module 110. The content providing module 209 may combine the search results to be gathered from the search queries. The search queries may be additive (undersea equipment also with undersea drones) as well as subtractive (remove all results from websites). The content providing module 209 may be configured to provide relevant content in the form of templates on single line search queries. The content providing module 209 may also be configured to suggest the search queries and the relevant content in response to the user's search queries. The database 203 may be configured to store the list of search results, user's search queries, and suggested search queries and the list of search results.

The content highlighting module 211 may be configured to highlight the relevant content of web pages from the list of search results and display the highlighted relevant content of the web pages from the list of search results on the first computing device 102 and/or the second computing device 104. The content deleting module 213 may be configured to use artificial intelligent techniques within the templates to provide the relevant content from many sources and filter out/delete the irrelevant content on the first computing device 102 and/or the second computing device 104. The content deleting module 213 may be further configured to allow the user to delete the irrelevant search results on the first computing device 102 and/or the second computing device 104.

The feedback module 215 may be configured to enable the user to input feedbacks to the list of search results and analyze the feedbacks to filter out irrelevant search results to the user during future searches on the first computing device 102 and/or the second computing device 104. The list of search results are liked or disliked by the users on the first computing device 102 and/or the second computing device 104. The simulation module 217 may be configured to execute the list of search results in a simulation environment to the user using three-dimensional (3D) manipulation techniques. The simulation module 217 may also be configured to enable the user to manipulate and sift the list of search results.

Referring to FIG. 3, FIG. 3 is an example screen 300 depicting a search result webpage, in accordance with one or more exemplary embodiments. The search result webpage 300 includes a query box 302a, a refine button 302b, a done button 302c, a stop button 302d, a refresh button 302e, a minimize button 302f, a file button 302g, a help button 302h, a list of search results 304, a settings button 306a, a menu button 306b, a selected result webpage 308, a save button 310, a navigation bar 312, and a saved phrase filter 314. The navigation bar 312 includes elements such as Back 312a, Forward 312b, an open in browser button 312c, address control 312d for navigating among URLs as well-known. Entry of the URL into the address control 312d and actuation of the URL such as by return or execution of a GO button 312e causes the browser button 312c to locate and retrieve the identified search results into the list of search results 304.

The query box 302a includes a search query description. The query box 302a also includes a search button that may be selected by the user to initiate search of the results using the query description specified in the query box 302a. The list of search results may be appeared on the first computing device 102 and/or the second computing device 104 after selecting the search button of the query box 302a. The refine button 302b may be configured to allow the user to give refined search query on the query box so that the optimized search engine 108 may give refined search results on the first computing device 102 and/or the second computing device 104. The user may select the done button 302c once the search query is finalized. If the user selects the stop button 302d, then it stops the searching results. The refresh button 302e may be configured to allow the user to refresh the webpage and the minimize button 302f may be configured to allow the user to minimize webpage. The file button 302g may be configured to load the different files on the first computing device 102 and/or the second computing device 104. If the user selects the help button 302h, then the help button 302h opens the web browser containing help information/guidance information.

The list of search results 304 includes the setting button 306a and the menu button 306b. If the user selects the menu button 306b, then menu may be displayed on the first computing device 102 and/or the second computing device 104. The setting button 306a may control any number of settings of the input search query. If the user selects the setting button 306a a setting menu may appear on the first computing device 102 and/or the second computing device 104. If the user selects the at least one search result from the list of search results 304, then the selected result webpage 308 may be appeared on the first computing device 102 and/or the second computing device 104. If the user selects the save button 310, then the selected result webpage 308 may be saved on the first computing device 102 and/or the second computing device 104. The saved phrase filter 314 may be configured to discard the list of search results which may be filtered out from a new list of search results, and the user may refresh the list of search results of previous queries depending on how the user value the insight provided.

Referring to FIG. 4, FIG. 4 is an example screen 400 depicting an embodiment of the content extraction module 110 on the first computing device 102 and/or the second computing device 104, in accordance with one or more exemplary embodiments. The content extraction module 110 includes a voice assistant 402, a search bar 404, and tiles 406a, 406b, 406c, 406d, 406e, 406f, 406g, 406h, 406i.

The voice assistant 402 may be accessed from servers by the first computing device 102 and/or the second computing device 104. The voice assistant 402 may transform an expression received from a user to a processor (not shown). The processor (not shown) may process the voice input to understand the voice in a natural language context. The content extraction module 110 may include a linguistic algorithm for the translation of words into symbols or tokens. In an embodiment, the user may long press on the voice assistant icon to open the voice assistant 402 prompt, then user speaks the search query (for example, ABE LINCOLN) into a microphone, the content extraction module 110 gives the search query on the search bar 404. Then, the user may select any tile 406a, 406b, 406c, 406d, 406e, 406f, 406g, 406h, 406i displayed on the first computing device 102 and/or the second computing device 104 to get relevant content of results. If the user selects the tile 406i, then a list of books 408 may be displayed on the first computing device 102 and/or the second computing device 104. The list of books 408 may be top curated books listed in order of relevance or by rank of popularity. The list of books 408 popularizes the screen when the tile 406i is pressed. The list of books 408 may include, but not limited to, Anna Karenina by Leo Tolstoy, Madame Bovary by Gustave Flaubert, War and Peace by Leo Tolstoy, The Great Gatsby by F. Scott Fitzgerald, Middlemarch by George Eliot, The Adventures of Huckleberry Finn by Mark Twain, and the like. The list of books 408 present in augmented reality/virtual reality may appear in space of that reality. Each image may also be manipulated through a sensory detection of hand motions or a manipulation of the hand. Early iterations may be done by images of commonly understood meaning and then measures eye perception to make a unique iteration to the user translation of understood principle. For example, the word flower may appear as several images of single or bouquet varieties. The first images received may be given priority to the user and the second etc. In future expressions of the word flower the image may appear as understood with the varieties obscured in the background. As understanding changes so the image from a single flower to bouquets.

Each of the tiles 406a, 406b, 406c, 406d, 406e, 406f, 406g, 406h, 406i includes (or acts as) a link to a website. The website may include, but not limited to, a social networking website (SN website), E-commerce website, images website, date website, and the like. The tiles 406a, 406b, 406c, 406d, 406e, 406f, 406g, 406h, 406i, in the depicted embodiment, may be visually presented to the user as square buttons with black background and with lettering populate the bottom ⅓ of the screen depicted therein, a logo and a name of a resource for enabling the user to identify which resource the particular one of the tile is linked to. The tiles 406a, 406b, 406c, 406d, 406e, 406f, 406g, 406h, 406i may be implemented as differently shaped buttons, as website links presented or the like.

FIG. 4 exemplifies tabs or tabular data presented in fly out displays. FIG. 4 presents a tab icon or folder manipulation that are populated by knowledge graphs in a mixed or augmented reality environment.

Referring to FIG. 5, FIG. 5 is an example screen 500 depicting another embodiment of the content extraction module 110 on the first computing device 102 and/or the second computing device 104, in accordance with one or more exemplary embodiments. The content extraction module 110 includes the tiles 506a, 506b, 506c, 506d, 506e, 506f, 506g, 506h, and 506i. The user may select any tile 506a, 506b, 506c, 506d, 506e, 506f, 506g, 506h, 506i displayed on the first computing device 102 and/or the second computing device 104 to get relevant content. If the user selects the tile 506d, then a list of images 512 may be displayed on the first computing device 102 and/or the second computing device 104. The list of images 512 populates the screen when the tile 506d is pressed. The list of images 512 present in the simulation environment may appear in space of that reality. Each image 512 may also be manipulated through the sensory detection of hand motions or the manipulation of the hand. Early iterations may be done by images of commonly understood meaning and then measures eye perception, eye movements are then measured to create or develop a unique iteration for the user, that iteration of lights images color and brightness may then be animated to make a unique iteration to the user translation of understood principle through an interaction of the content being animated.

Each of the tiles 506a, 506b, 506c, 506d, 506e, 506f, 506g, 506h, 406i includes (or acts as) a link to the website. The website may include, but not limited to, a social networking website (SN website), E-commerce website, images website, date website, and the like. The tiles 506a, 506b, 506c, 506d, 506e, 506f, 506g, 506h, 506i, in the depicted embodiment, may be visually presented to the user as square buttons with black background and with lettering populate the bottom ⅓ of the screen depicted therein, a logo and a name of a resource for enabling the user to identify which resource the particular one of the tile is linked to. The tiles 506*a*, 506*b*, 506*c*, 506*d*, 506*e*, 506*f*, 506*g*, 506*h*, 506*i* may be implemented as differently shaped buttons, as website links presented or the like.

Referring to FIG. 6, FIG. 6 is an example screen 600 depicting another embodiment of the content extraction module 110 on the first computing device 102 and/or the second computing device 104, in accordance with one or more exemplary embodiments. The content extraction module 110 includes the tiles 606*a*, 606*b*, 606*c*, 606*d*, 606*e*, 606*f*, 606*g*, 606*h*, and 606*i*. The user may select one or more tiles 606*a*, 606*b*, 606*c*, 606*d*, 606*e*, 606*f*, 606*g*, 606*h*, 606*i* displayed on the first computing device 102 and/or the second computing device 104 to get relevant content. If the user selects the tile 606*d* and the tile 606*i*, then the list of images 612 and the list of books 608 may be displayed on the first computing device 102 and/or the second computing device 104. The list of books 608 may include, but not limited to, Anna Karenina by Leo Tolstoy, Madame Bovary by Gustave Flaubert, War and Peace by Leo Tolstoy, The Great Gatsby by F. Scott Fitzgerald, Middlemarch by George Eliot, The Adventures of Huckleberry Finn by Mark Twain, and the like. The list of images 612 and the list of books 608 popularize the screen when the tiles 606*d*, 606*i* are pressed. The list of images 612 and the list of books 608 present in the simulation environment may appear in space of that reality. Each image 612 or 608 may also be manipulated through the sensory detection of hand motions or the manipulation of the hand.

Each of the tiles 606*a*, 606*b*, 606*c*, 606*d*, 606*e*, 606*f*, 606*g*, 606*h*, 606*i* includes (or acts as) a link to the website. The website may include, but not limited to, a social networking website (SN website), E-commerce website, images website, date website, and the like. The tiles 606*a*, 606*b*, 606*c*, 606*d*, 606*e*, 606*f*, 606*g*, 606*h*, 606*i*, in the depicted embodiment, may be visually presented to the user as square buttons with black background and with lettering populate the bottom ⅓ of the screen depicted therein, a logo and a name of a resource for enabling the user to identify which resource the particular one of the tile is linked to. The tiles 606*a*, 606*b*, 606*c*, 606*d*, 606*e*, 606*f*, 606*g*, 606*h*, 606*i* may be implemented as differently shaped buttons, as website links presented or the like.

Referring to FIG. 7A, FIG. 7B, FIG. 7C, FIG. 7D, FIG. 7E, FIG. 7A, FIG. 7B, FIG. 7C, FIG. 7D, FIG. 7E are example diagrams 700*a*, 700*b*, 700*c*, 700*d*, 700*e* depicting heat maps, in accordance with one or more exemplary embodiments. The example diagrams 700*a*, 700*b*, 700*c*, 700*d*, 700*e* includes heat maps, but not limited to, a first heat map 702, a second heat map 704, a third heat map 706, a fourth heat map 708, and a fifth heat map 710. The heat maps 702, 704, 706, 708, 710 may include an overlay of the images bringing various color and light intensity to tiles, symbols, or tokens, as the expression of popularity. For example, it is contemplated that in a historical view of famous person a timeline may be presented with various documents, reports etc. If the historical figure is Abraham Lincoln, as an example, the tiles arranged in the appearance of a file cabinet drawer along the bottom or side of the display may show different folders. The different folders about his death, election campaign, emancipation proclamation or other key milestones in his life and career may have great intensity of light making the display appear to glow brighter. Whereas, briefs or transactional documents relating to his lawyering for the railroads would may dimmer as less popular. It is contemplated this affect may act like a weather map or heat map or mood ring with changing intensity and color for a lively interaction between users as an indicator of popularity at the time. The heat maps 702, 704, 706, 708, 710 may be displayed on the first computing device 102 and/or the second computing device 104. The heat maps 702, 704, 706, 708, 710 may show popularity, relevance, and importance in a collaborative way. The heat maps 702, 704, 706, 708, 710 may act as a reporting metric that helps the users to visualize the effectiveness of the templates. The heat map(s) 702, 704, 706, 708, 710, which shows what others are doing, may direct user attention to the most popular categories in response to fellow user selections of various tiles. The heat map(s) 702, 704, 706, 708, 710 may be displayed on the first computing device 102 and/or the second computing device 104 in response to how often the users select certain tiles that allow others to participate in a given search community. For instance, the users who regularly search sports may see the heat map(s) 702, 704, 706, 708, 710 during major sporting events. The tiles may include a software networking-website (SN-website), images, E-commerce website, books, and the like.

The heat map(s) 702, 704, 706, 708, 710 may have the colors behind the tiles so that users may identify the more popular selections. For example, the tiles may be defined with limited opaqueness, allowing for the heat map(s) 702, 704, 706, 708, 710 that highlights the more popular selections through the use of both color and light intensity. Design wise, the tiles may be bordered in uniform shape, with the heat map 702, 704, 706, 708, 710 akin to a weather storm-tracking mechanism for hurricanes or a mood ring with a nebulous color-changing capacity that captures the frequency of user selection and makes a visually-appealing representation of predictive analysis. The heat map(s) 702, 704, 706, 708, 710 may show the most popular tags ranged by frequency, listed alphabetically. While such representation provides a general idea of what the text is about it omits important information about the different topics inside, their relationships, and the structure of the discourse. The heat map(s) 702, 704, 706, 708, 710 may show resulting visualization provides a very comprehensive visual overview of a text 704. The heat map(s) 702, 704, 706, 708, 710 may show the most influential words and also how they are related to one another and how they are grouped into distinct topics. For example, the influential words may include colors, users, popular selections, heat map, tiles, users, search community, sports, sporting events, SN-website, images, E-commerce website, books, and the like.

Referring to FIG. 8, FIG. 8 is an example flow diagram 800 depicting a method for providing relevant content in response to the search query, in accordance with one or more exemplary embodiments. The method 800 may be carried out in the context of the details of FIG. 1, FIG. 2, FIG. 3, FIG. 4, and FIG. 5, FIG. 6, and FIG. 7A, FIG. 7B, FIG. 7C, FIG. 7D, FIG. 7E. However, the method 800 may also be carried out in any desired environment. Further, the aforementioned definitions may equally apply to the description below.

The method commences at step 802, the user is allowed to input the search query to the content extraction module using the computing device. Thereafter, at step 804, the optimized search engine receives the search query from the content extraction module. Then, at step 806, the optimized search engine executes the search query and chooses the templates associated with topics in response to the search query. Thereafter, at step 808, the optimized search engine collects the list of search results from different online sources using the chosen templates associated with the topics and transfers the list of collected search results to the content extraction module. The online sources may include, but not limited to, websites, internet sources, and the like. Thereafter, at step 810, the optimized search engine highlights the relevant content of web pages from the list of search results and displays the highlighted relevant content of the web pages from the list of search results by filtering out irrelevant content on the computing device. Thereafter, at step 812, content extraction module executes the list of search results in the simulation environment using 3-D manipulation techniques. Here, the user may be allowed to manipulate and sift the list of search results in the simulation environment. Thereafter, at step 814, the content extraction module enables the user to give the feedback to the list of search results and analyzes the feedback to filter out irrelevant search results to the user during future searches on the computing device. The feedback may include, but not limited to, decisions about what is relevant, what is not relevant, and the like.

Referring to FIG. 9, FIG. 9 is an example flow diagram 900 depicting a method for displaying the search results in the template form in response to the search query, in accordance with one or more exemplary embodiments. The method 900 may be carried out in the context of the details of FIG. 1, FIG. 2, FIG. 3, FIG. 4, and FIG. 5, FIG. 6, FIG. 7A, FIG. 7B, FIG. 7C, FIG. 7D, FIG. 7E, and FIG. 8. However, the method 900 may also be carried out in any desired environment. Further, the aforementioned definitions may equally apply to the description below.

The user is allowed to input the search query to the content extraction module using the computing device, at step 902. The optimized search engine receives the search query from the content extraction module at step 904. Thereafter, at step 906, determine whether the search query is known? If answer to step 906 is YES, then the exemplary method continues at step 908, the optimized search engine chooses the templates in response to the search query from stored associations of the database between the topics and the templates. If answer to step 906 is NO, then the exemplary method continues at step 910, the optimized search engine chooses the templates from suggested templates of the database to create associations between the templates and the topics. Thereafter, at step 912, the optimized search engine transfers the list of search results to the content extraction module once the list of search results collected using the chosen templates and displays the list of search results in a template form on the computing device.

Referring to FIG. 10, FIG. 10 is an example flow diagram 1000 depicting a method for using the templates as relevant search results for the search query, in accordance with one or more exemplary embodiments. The method 1000 may be carried out in the context of the details of FIG. 1, FIG. 2, FIG. 3, FIG. 4, and FIG. 5, FIG. 6, FIG. 7A, FIG. 7B, FIG. 7C, FIG. 7D, FIG. 7E, and FIG. 8, and FIG. 9. However, the method 1000 may also be carried out in any desired environment. Further, the aforementioned definitions may equally apply to the description below.

The user (for example, knowledge engineers, practitioners, artificial algorithms) creates the templates on the content extraction module via the computing device, at step 1002. Thereafter, at step 1004, the database receives the templates from the content extraction module and adds the templates continually for various categories of topics. Thereafter, at step 1006, the optimized search engine uses the templates as the relevant list of search results for the search query.

Referring to FIG. 11, FIG. 11 is an example flow diagram 1100 depicting a method for allowing the user to delete irrelevant list of search results and enabling the user to give the feedback, in accordance with one or more exemplary embodiments. The method 1100 may be carried out in the context of the details of FIG. 1, FIG. 2, FIG. 3, FIG. 4, and FIG. 5, FIG. 6, FIG. 7A, FIG. 7B, FIG. 7C, FIG. 7D, FIG. 7E, and FIG. 8, FIG. 9, and FIG. 10. However, the method 1100 may also be carried out in any desired environment. Further, the aforementioned definitions may equally apply to the description below.

The optimized search engine executes the search query to get a new list of search results to combine with a previous list of search results, at step 1102. Thereafter, at step 1104, the database stores the new list of search results, the previous list of search results, and the executed one or more search queries in the database. Here, the previous list of search results may be hidden on the content extraction module in the future by the new list of search results. Thereafter, at step 1106, the content extraction module allows the user to delete irrelevant list of search results and enables the user to give the feedback to the list of search results. Thereafter, at step 1108, the content extraction module sends the given feedback to the database and avoids biases of any individual dominant, or even monopolistic, existing the list of search results on the computing device, the list of results and the contents therein are then translated into images that may be animated depicting the data or knowledge to be shared.

Referring to FIG. 12, FIG. 12 is a block diagram illustrating the details of digital processing system 1200 in which various aspects of the present disclosure are operative by execution of appropriate software instructions. Digital processing system 1200 may correspond to the first computing device 102 and the second computing device 104 (or any other system in which the various features disclosed above can be implemented).

Digital processing system 1200 may contain one or more processors such as a central processing unit (CPU) 1210, random access memory (RAM) 1220, secondary memory 1230, graphics controller 1260, display unit 1270, network interface 1280, an input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present disclosure. CPU 1210 may contain multiple processing units, with each processing unit potentially being designed for a specific task. Alternatively, CPU 1210 may contain only a single general-purpose processing unit.

RAM 1220 may receive instructions from secondary memory 1230 using communication path 1250. RAM 1220 is shown currently containing software instructions, such as those used in threads and stacks, constituting shared environment 1225 and/or user programs 1226. Shared environment 1225 includes operating systems, device drivers, virtual machines, etc., which provide a (common) run time environment for execution of user programs 1226.

Graphics controller 1260 generates display signals (e.g., in RGB format) to display unit 1270 based on data/instructions received from CPU 1210. Display unit 1270 contains a display screen to display the images defined by the display signals. Input interface 1290 may correspond to a keyboard and a pointing device (e.g., touch-pad, mouse) and may be used to provide inputs. Network interface 1280 provides connectivity to a network (e.g., using Internet Protocol), and may be used to communicate with other systems (such as those shown in FIG. 1, network 106) connected to the network.

Secondary memory 1230 may contain hard drive 1235, flash memory 1236, and removable storage drive 1237. Secondary memory 1230 may store the data software instructions (e.g., for performing the actions noted above with respect to the Figures), which enable digital processing system 1200 to provide several features in accordance with the present disclosure.

Some or all of the data and instructions may be provided on the removable storage unit 1240, and the data and instructions may be read and provided by removable storage drive 1237 to CPU 1210. Floppy drive, magnetic tape drive, CD-ROM drive, DVD Drive, Flash memory, a removable memory chip (PCMCIA Card, EEPROM) are examples of such removable storage drive 1237.

The removable storage unit 1240 may be implemented using medium and storage format compatible with removable storage drive 1237 such that removable storage drive 1237 can read the data and instructions. Thus, removable storage unit 1240 includes a computer readable (storage) medium having stored therein computer software and/or data. However, the computer (or machine, in general) readable medium can be in other forms (e.g., non-removable, random access, etc.).

In this document, the term "computer program product" is used to generally refer to the removable storage unit 1240 or hard disk installed in hard drive 1235. These computer program products are means for providing software to digital processing system 1200. CPU 1210 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1230. Volatile media includes dynamic memory, such as RAM 1220. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1250. Transmission media can also take the form of acoustic or light waves, such as those generated during radio-wave and infra-red data communications.

In an embodiment of the present disclosure, the optimized artificial intelligence search system 100 includes the computing device 102/104 configured to allow the user to input one or more search queries to a content extraction module 110 which is in communication with an optimized search engine 108. The optimized search engine 108 may be configured to receive the one or more search queries from the content extraction module 110 and execute the one or more search queries to render a list of search results to the content extraction module 110.

In another embodiment of the present disclosure, the optimized artificial intelligence search system 100 further includes a database 203 comprising one or more templates associated with one or more topics and the optimized search engine 108 may be configured to interact with the database 203 to choose the one or more templates associated with the one or more topics in response to the one or more search queries. The optimized search engine 108 may be configured to collect the list of search results from a plurality of online sources using the one or more chosen templates and transfer the collected list of search results to the content extraction module 110. The content extraction module 110 may be configured to highlight a relevant content of a plurality of web pages from the list of search results and display the highlighted relevant content of the plurality of web pages from the list of search results by filtering out an irrelevant content on the computing device 102/104. The computing device 102/104 may be configured to execute the list of search results in the simulation environment to the user using one or more three-dimensional (3D) manipulation techniques from the content extraction module 110.

In another embodiment of the present disclosure, the optimized search engine 108 may be configured to execute the one or more search queries to get a new list of search results to combine with a previous list of search results in response to the one or more search queries. The content extraction module 110 may be configured to enable the user to input a feedback to the list of search results and analyze the feedback to delete one or more irrelevant search results to the user during future searches on the computing device 102/104. The content extraction module 110 may be configured to enable the user to create the one or more templates which are transfer to the database 203 and the optimized search engine 108 may be configured to apply the one or more created templates across the one or more topics to find the list of search results. The one or more templates comprising one or more strategies for guiding the optimized search engine 108 to find the list of search results. The optimized search engine may be configured to choose the one or more templates from stored associations of the database 203 between the one or more topics and the one or more templates when the one or more search queries are known to the optimized search engine 108. The optimized search engine 108 may be configured to choose the one or more templates from suggested templates of the database 203 to create the associations between the one or more templates and the one or more topics when the one or more search queries are unknown to the optimized search engine 108.

In another embodiment of the present disclosure, a method for providing content in response to search queries, comprising: allowing the user on the computing device 102/104 to input one or more search queries to the content extraction module 110 which is in communication with the optimized search engine 108, receiving the one or more search queries from the content extraction module 110 to the optimized search engine 108, the optimized search engine 108 may be configured to execute the one or more search queries to render a list of search results to the content extraction module 110, choosing one or more templates associated with one or more topics from the database 203 by the optimized search engine 108 in response to the one or more search queries, the optimized search engine 108 may be configured to collect the list of search results from a plurality of online sources using the one or more templates associated with the one or more topics and transfer the list of collected search results to the content extraction module 110, highlighting a relevant content of a plurality of web pages from the list of search results by the content extraction module 110 and displaying the highlighted relevant content of the plurality of web pages from the list of search results by filtering out an irrelevant content on the computing device 102/104, executing the list of search results in the simulation environment to the user using three-dimensional (3D) manipulation techniques by the content extraction module 110, the content extraction module 110 enables the user to manipulate and sift the list of search results, and enabling the user to input a feedback to the list of search results by the content extraction module 110 and analyzing the feedback to filter out one or more irrelevant search results to the user during future searches on the computing device 102/104, enabling the user to create one or more templates on the content extraction module 110 and adding the one or more created templates associated with the one or more topics to the database 203, using the one or more templates as the list of search results by the optimized search engine 108 in response to the one or more search queries, allowing the user to share the list of search results to others on the content extraction module 110.

In another embodiment of the present disclosure, a computer program product comprising a non-transitory computer-readable medium having a computer-readable program code embodied therein to be executed by one or more processors, the program code including instructions to: allow the user on the computing device to input one or more search queries to the content extraction module 110 which is in communication with the optimized search engine 108, receive the one or more search queries from the content extraction module 110 to the optimized search engine 108, the optimized search engine 108 may be configured to execute the one or more search queries to render a list of search results to the content extraction module 110, choose one or more templates associated with one or more topics from the database 203 by the optimized search engine 108 in response to the one or more search queries, the optimized search engine 108 may be configured to collect the list of search results from a plurality of online sources using the one or more templates associated with the one or more topics and transfer the list of collected search results to the content extraction module 110, highlight a relevant content of a plurality of web pages from the list of search results by the content extraction module 110 and display the highlighted relevant content of the plurality of web pages from the list of search results by filtering out an irrelevant content on the computing device 102/104, execute the list of search results in the simulation environment to the user using three-dimensional (3D) manipulation techniques by the content extraction module 110, the content extraction module 110 enables the user to manipulate and sift the list of search results; and enable the user to input a feedback to the list of search results by the content extraction module 110 and analyze the feedback to filter out one or more irrelevant search results to the user during future searches on the computing device 102/104. The content extraction module 110 also auto assembles the data from the list of results into a linguistic algorithm that is used to automate an assembler of images depicting the contents and animating those images to interact in a way that describe the meaning of the words within the search result.

In another embodiment of the present disclosure, the optimized search engine 108 comprising a search query resolving module 205 configured to resolve the one or more search queries received from the content extraction module 110. The optimized search engine 110 comprising a template selection module 207 configured to allow the user to build and add the one or more templates associated with one or more topics to the database 203. The optimized search engine 108 comprising a content providing module 209 configured to provide the relevant content in the form of the one or more templates to the content extraction module 110. The content providing module 209 may also be configured to suggest the one or more search queries and the relevant content in response to the one or more search queries to the content extraction module 110. The database 203 may be configured to store the list of search results, the one or more search queries, and the feedback. The content extracting module 110 further comprising a content deleting module 213 configured to use artificial intelligence techniques within the one or more templates to provide the relevant content of the plurality of web pages from the plurality of online sources by filtering out the irrelevant content on the computing device 102/104. The content deleting module 213 may be further configured to allow the user to delete the one or more irrelevant search results on the computing device 102/104. The content extraction module 110 comprising one or more heat maps configured to show the popular, relevant, and important list of search results in response to the one or more search queries on the computing device 102/104.

Disclosed embodiments include search results presented as a pinch zoomable 3D representation of an outline of search results. Search results may also be presented in a emoticon system or emoticon ecosystem, which may work exceptionally well. The images (emoticons) could represent sentiment analysis on the documents. Choosing of emoticons or combinations, is another way to create subsets that either enhance the positioning of results, due to relevance signaling by the SME, or demote or remove results based on a combination of sentiments.

Disclosed embodiments may include means and methods of when the user is allowed to delete one or more irrelevant search results, the user is queries as to what makes the search result irrelevant. For example: The user may be prompted with words or phrases to describe why the result is irrelevant Once the user has specified words or phrases that characterize why the result is irrelevant, the list of search results is scanned to see if any additional results now seem irrelevant.

The user is allowed the chance to agree that the additional results are irrelevant, or if relevant, to specify additional words or phrases to show why these are actually relevant, In this way the specificity of rules can be tuned to be more powerful, and the user is easily able to teach the system sophisticated judgement about future search results Any feedback that the SME gives, whether to increase the relevance of a document, or to signal that a document is irrelevant, does not end the process as feedback on that one item.

The system will prompt the SME to specify why they are making that choice:

This allows more general heuristic rules can be generated to help classify additional results according to the preferences of the SME.

This allows the system to be tuned without the actual writing of specific rules, although an interface should be available to allow the rules entered so far to be further edited by the SME if desired.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. An optimized artificial intelligence search system for providing content in response to search queries, comprising:
    a computing device configured to allow a user to input one or more search queries to a content extraction module which is in communication with an optimized search engine, whereby the optimized search engine is configured to receive the one or more search queries from the content extraction module and execute the one or more search queries to render a list of search results to the content extraction module; and
    a database comprising one or more templates associated with one or more topics, wherein:
    the optimized search engine is configured to interact with the database to choose at least one template from the one or more templates associated with the one or more topics in response to the one or more search queries, the optimized search engine being configured to interact with the database, is further configured to:
        choose the at least one template from stored associations in the database between the one or more topics and the one or more templates when the one or more search queries are known to the optimized search engine, wherein the association is created between the templates and the topics by a user and is added to the database; and
        choose the at least one template from suggested templates of the database to create the associations between the one or more templates and the one or more topics when the one or more search queries are unknown to the optimized search engine;
    the optimized search engine is configured to collect the list of search results from a plurality of online sources using the chosen at least one template and transfer the collected list of search results in the form of the at least one template to the content extraction module;
    the content extraction module is configured to enable the user to create the one or more templates which are transferred to the database and the optimized search engine is configured to apply the one or more created templates across the one or more topics to find the list of search results, and is further configured to highlight a relevant content of a plurality of web pages from the list of search results and display, in the form of the template on the computing device, the highlighted relevant content of the plurality of web pages from the list of search results by filtering out an irrelevant content on the computing device;
    the computing device is configured to execute the list of search results in a simulation environment to the user using one or more three-dimensional (3D) manipulation techniques from the content extraction module, wherein the content extraction module is configured to translate the list of search results and the content into images; and
    the computing device further configured to execute the list of search results in a tabular format.

2. The optimized artificial intelligence search system of claim 1, wherein the computing device is further configured to execute the search results in the format of tabs by use of semantic vector space modelling.

3. The optimized artificial intelligence search system of claim 1, wherein the computing device is configured to present a first set of search results on the left eye of a user and a second set of results to the right eye of the user, with the content of the first set of results categorized as analytical and the content of the second set of results categorized as artistic.

4. The optimized artificial intelligence search system of claim 1, wherein the one or more templates comprises one or more strategies for guiding the optimized search engine to find the list of search results.

5. A method for providing content in response to search queries, the method comprising:
    allowing a user on a computing device to input one or more search queries to a content extraction module which is in communication with an optimized search engine;
    receiving the one or more search queries from the content extraction module by the optimized search engine, whereby the optimized search engine is configured to execute the one or more search queries to render a list of search results to the content extraction module;
    choosing at least one template from one or more templates associated with one or more topics from a database by the optimized search engine in response to the one or more search queries,
    wherein choosing the at least one template comprises choosing the at least one template from stored associations in the database between the one or more topics and the one or more templates when the one or more search queries are known to the optimized search engine, wherein the association is created between the templates and the topics by a user and is added to the database, and choosing the at least one template from suggested templates of the database to create the associations between the one or more templates and the one or more topics when the one or more search queries are unknown to the optimized search engine, wherein the optimized search engine is configured to collect the list of search results from a plurality of online sources using the chosen at least one template and transfer the list of collected search results in the form of the at least one template to the content extraction module;
    enabling the user to create the one or more templates by the content extraction module and adding the one or more created templates associated with the one or more topics to the database;
    highlighting a relevant content of a plurality of web pages from the list of search results by the content extraction module and displaying, in the form of the template on the computing device, the highlighted relevant content of the plurality of web pages from the list of search results by filtering out an irrelevant content on the computing device;
    executing the list of search results in a simulation environment to the user using three-dimensional (3D) manipulation techniques from the content extraction module, wherein the content extraction module is configured to translate the list of search results and the content into images, whereby the content extraction module is configured to enable the user to manipulate and sift the list of search results;

enabling the user to input a feedback to the list of search results by the content extraction module and analyzing the feedback to filter out one or more irrelevant search results to the user during future searches on the computing device; and executing the list of search results in a tabular format.

6. The method of claim 5, further comprising a step of using the one or more tabs as the list of search results by the optimized search engine in response to the one or more search queries.

7. The method of claim 5, further comprising a step of allowing the user to view a first set of the search results through the viewer's left eye and to view a second set of search results through the viewers right eye.

8. A computer program product comprising a non-transitory computer-readable medium having a computer-readable program code embodied therein to be executed by one or more processors, the program code including instructions to:

allow a user on a computing device to input one or more search queries to a content extraction module which is in communication with an optimized search engine;

receive the one or more search queries from the content extraction module by the optimized search engine, whereby the optimized search engine is configured to execute the one or more search queries to render a list of search results to the content extraction module;

choose at least one template from one or more templates associated with one or more topics from a database by the optimized search engine in response to the one or more search queries, wherein choosing the at least one template comprises choosing the at least one template from stored associations in the database between the one or more topics and the one or more templates when the one or more search queries are known to the optimized search engine, wherein the association is created between the templates and the topics by a user and is added to the database, and choosing the at least one template from suggested templates of the database to create the associations between the one or more templates and the one or more topics when the one or more search queries are unknown to the optimized search engine, wherein the optimized search engine is configured to collect the list of search results from a plurality of online sources using the chosen at least one template and transfer the list of collected search results to the content extraction module, wherein the optimized search engine comprises a content providing module configured to provide the collected search results in the form of the at least one template to the content extraction module, wherein the optimized search engine comprises a template selection module configured to allow the user to build and add the one or more templates associated with the one or more topics to the database;

highlight a relevant content of a plurality of web pages from the list of search results by the content extraction module and display, in the form of the template on the computing device, the highlighted relevant content of the plurality of web pages from the list of search results by filtering out an irrelevant content on the computing device;

execute the list of search results in a simulation environment to the user using three-dimensional (3D) manipulation techniques from the content extraction module, wherein the content extraction module is configured to translate the list of search results and the content into images, whereby the content extraction module is configured to enable the user to manipulate and sift the list of search results;

enable the user to input a feedback to the list of search results by the content extraction module and analyze the feedback to filter out one or more irrelevant search results to the user during future searches on the computing device; and execute the list of search results in a tabular format.

9. The computer program product of claim 8, wherein the optimized search engine comprising a search query resolving module configured to resolve the one or more search queries received as either left or right brain function information.

10. The computer program product of claim 8, wherein the content providing module is further configured to suggest the one or more search queries and the relevant content in response to the one or more search queries to the content extraction module.

11. The computer program product of claim 8, wherein the database is configured to store the list of search results, the one or more search queries, and the feedback.

12. The computer program product of claim 8, wherein the content extracting module further comprising a content deleting module configured to use artificial intelligence techniques within the one or more templates to provide the relevant content of the plurality of web pages from the plurality of online sources by filtering out the irrelevant content on the computing device.

13. The computer program product of claim 12, wherein the content deleting module is further configured to allow the user to delete the one or more irrelevant search results on the computing device.

14. The computer program product of claim 8, wherein the content extraction module comprising one or more heat maps configured to show the popular, relevant, and important list of search results in response to the one or more search queries on the computing device.

* * * * *